(12) United States Patent
Koike

(10) Patent No.: US 8,363,240 B2
(45) Date of Patent: Jan. 29, 2013

(54) IMAGE FORMING APPARATUS AND METHOD FOR RESPONDING TO ACCESS REQUEST

(75) Inventor: Hiroaki Koike, Kokubunji (JP)

(73) Assignee: Canon Kabushiki Kaisha, Tokyo (JP)

( * ) Notice: Subject to any disclaimer, the term of this patent is extended or adjusted under 35 U.S.C. 154(b) by 1232 days.

(21) Appl. No.: 11/759,775

(22) Filed: Jun. 7, 2007

(65) Prior Publication Data

US 2008/0018930 A1 Jan. 24, 2008

(30) Foreign Application Priority Data

Jun. 13, 2006 (JP) .................................. 2006-163880

(51) Int. Cl.
*G06K 15/00* (2006.01)
(52) U.S. Cl. ...................... 358/1.14; 358/1.13; 358/1.15; 358/1.16; 700/82; 710/5
(58) Field of Classification Search ............ 358/1.14, 358/1.13, 1.15, 1.16; 455/574; 700/82; 710/5
See application file for complete search history.

(56) References Cited

U.S. PATENT DOCUMENTS

| | | | | |
|---|---|---|---|---|
| 2003/0114205 A1* | 6/2003 | Yamashita | ...................... | 455/574 |
| 2003/0210215 A1* | 11/2003 | Takahashi | ........................ | 345/87 |
| 2005/0215234 A1 | 9/2005 | Fukuzawa et al. | | |
| 2006/0100724 A1* | 5/2006 | Miura et al. | ...................... | 700/82 |

FOREIGN PATENT DOCUMENTS

| | | |
|---|---|---|
| JP | 2000-172359 A | 6/2000 |
| JP | 2001-142587 A | 5/2001 |
| JP | 2001-273221 A | 10/2001 |
| JP | 2003-186579 A | 7/2003 |
| JP | 2004-260556 A | 9/2004 |
| JP | 2005-193652 A | 7/2005 |
| JP | 2005-215856 A | 8/2005 |
| JP | 2005-278044 A | 10/2005 |
| JP | 2006-004284 A | 1/2006 |

OTHER PUBLICATIONS

Machine translation of JP2001-273221 (published Oct. 2001) as relied upon by the examiner.*
Machine translation of JP2006-004284 (published Jan. 2006) as relied upon by the examiner.*

* cited by examiner

*Primary Examiner* — King Poon
*Assistant Examiner* — David S Cammack
(74) *Attorney, Agent, or Firm* — Canon USA, Inc., IP Division

(57) ABSTRACT

A method an apparatus for responding to an access request, the method and apparatus including storing ordinary display data and simplified display data used to respond to an access request, storing the simplified display data, accepting an access request, determining whether a power consumption state is in a power saving or ordinary power consumption state when receiving the access request, and responding to the access request using either the ordinary display data or the simplified display data depending on the power consumptions state.

17 Claims, 22 Drawing Sheets

ORDINARY OPERATING MODE (NORMAL STATE)

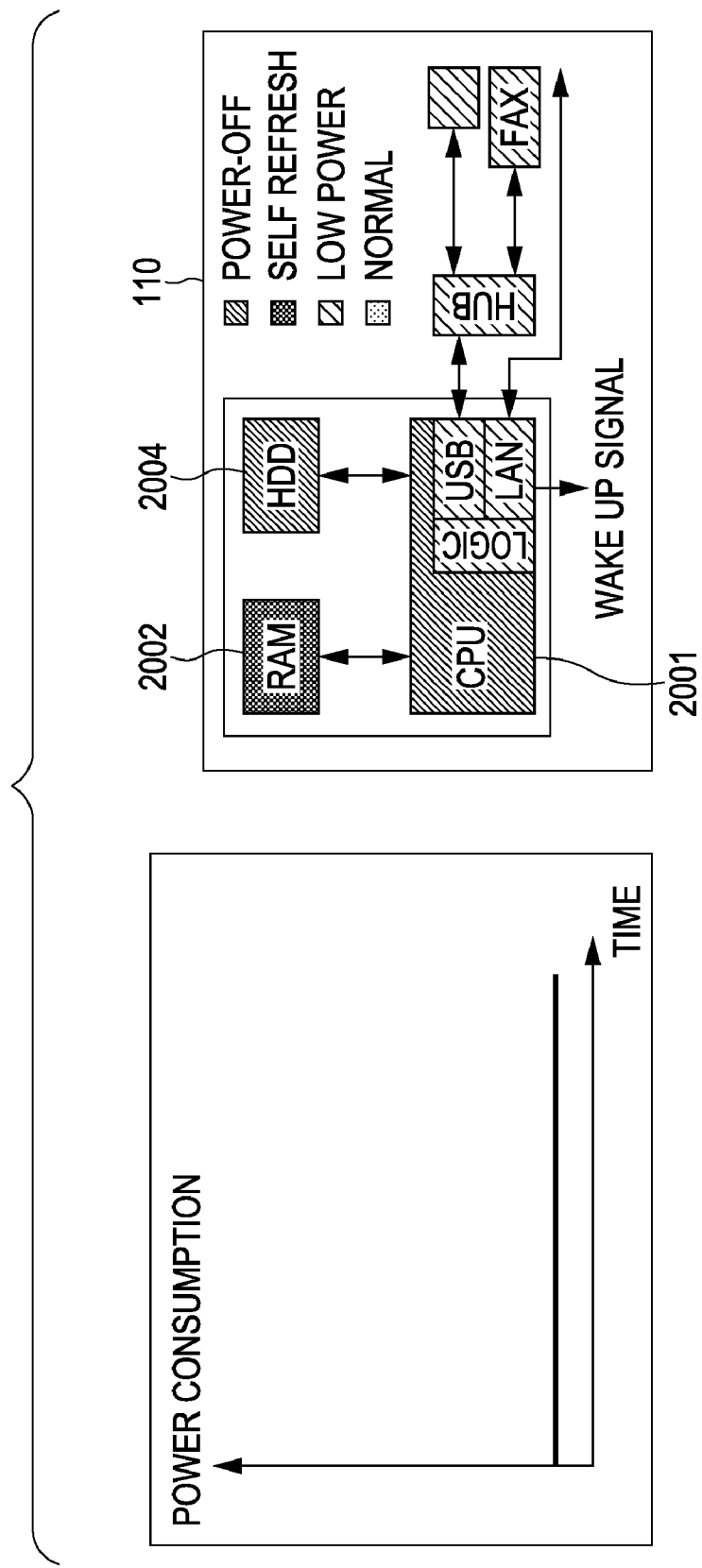

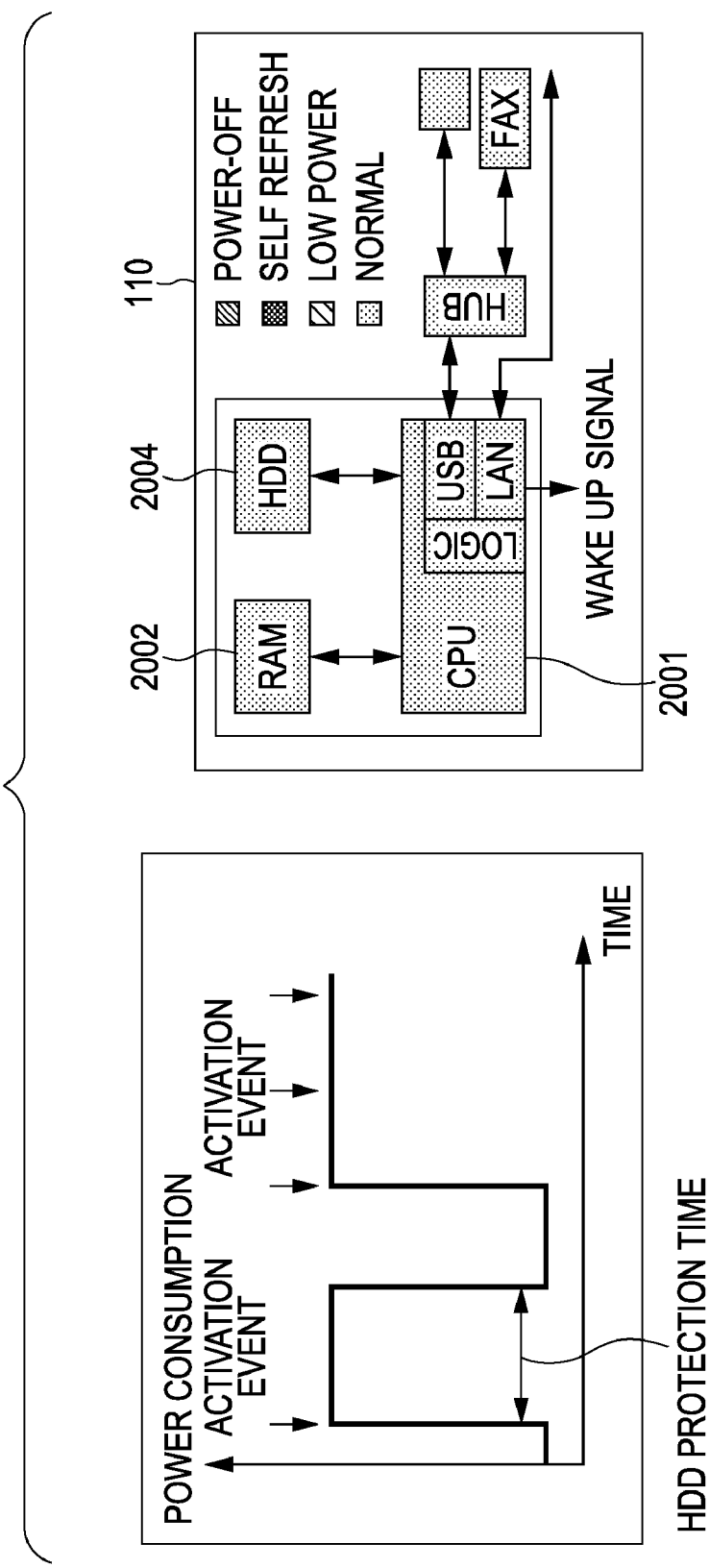

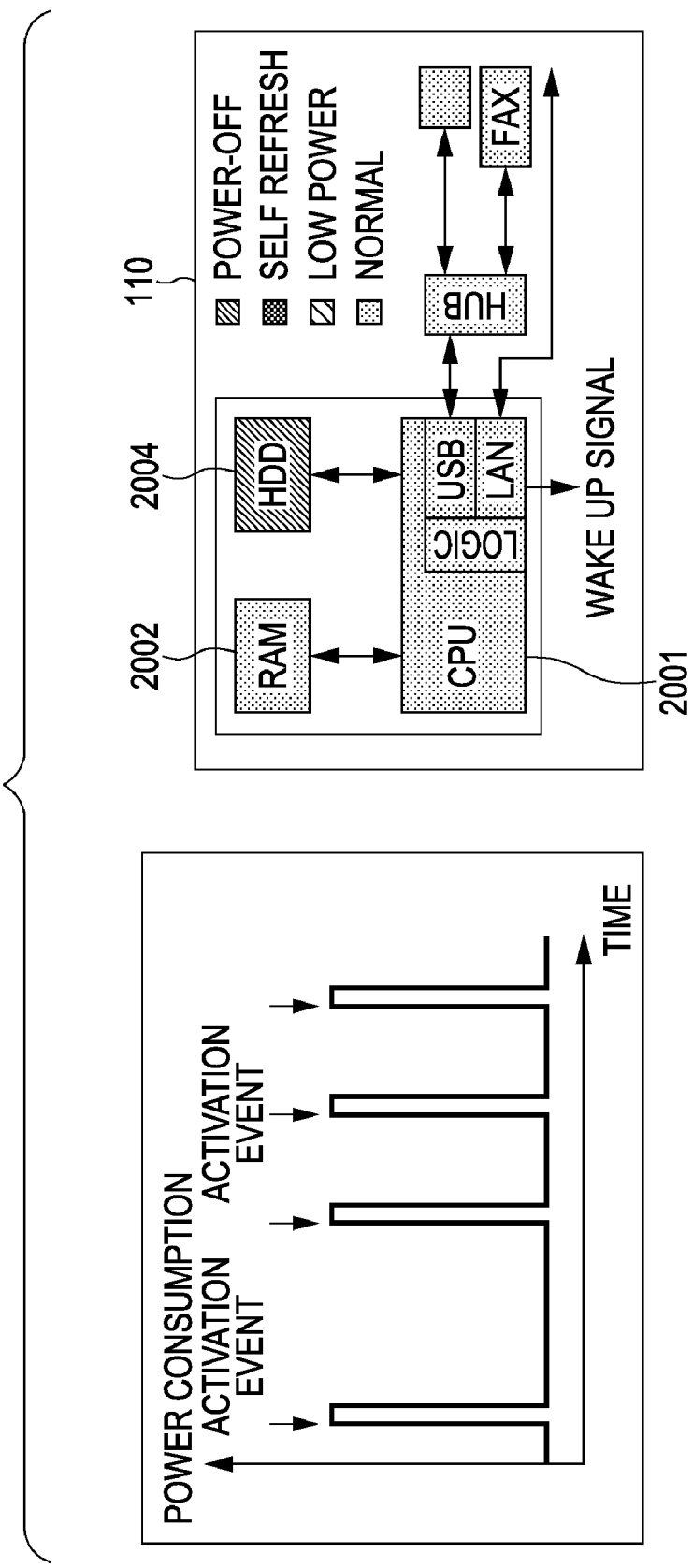

600

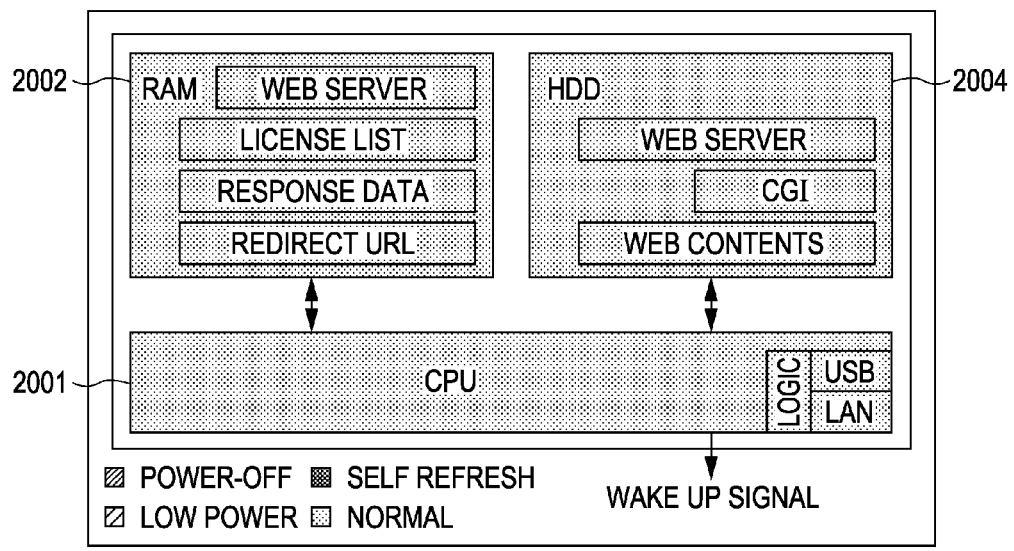
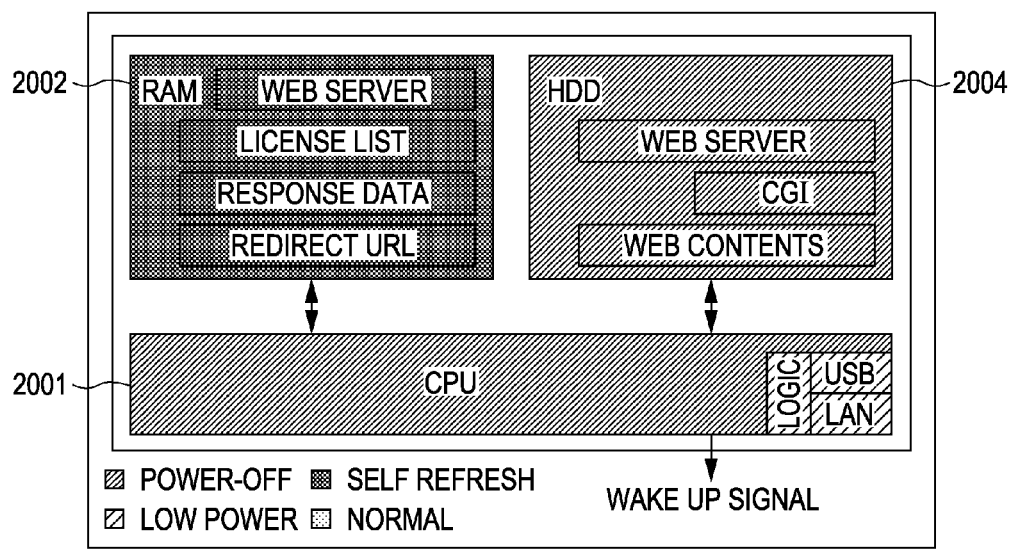

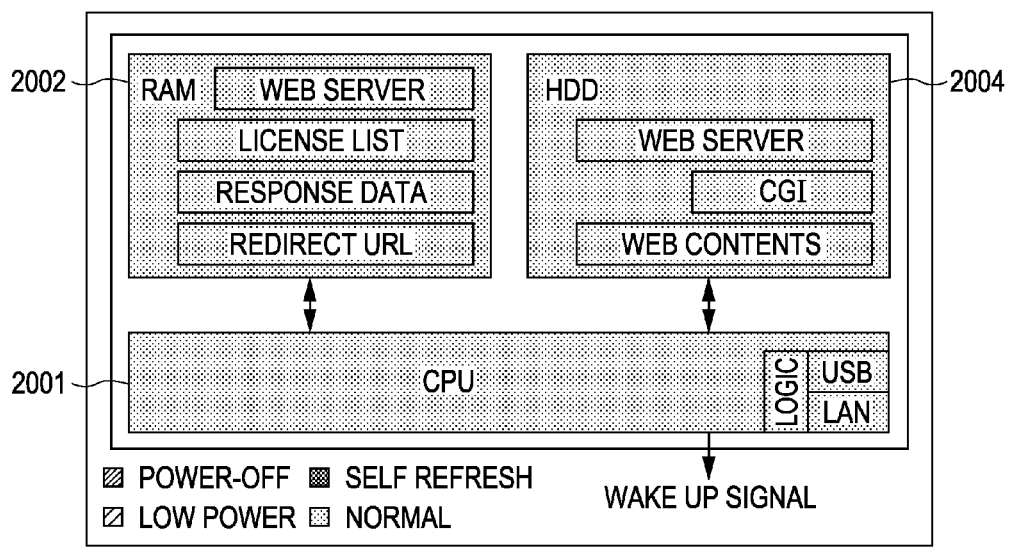
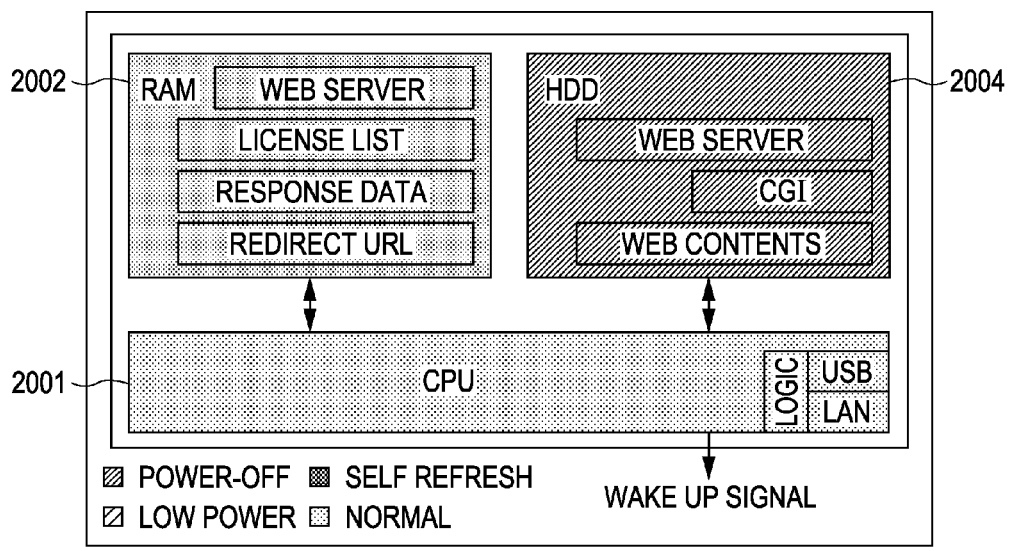

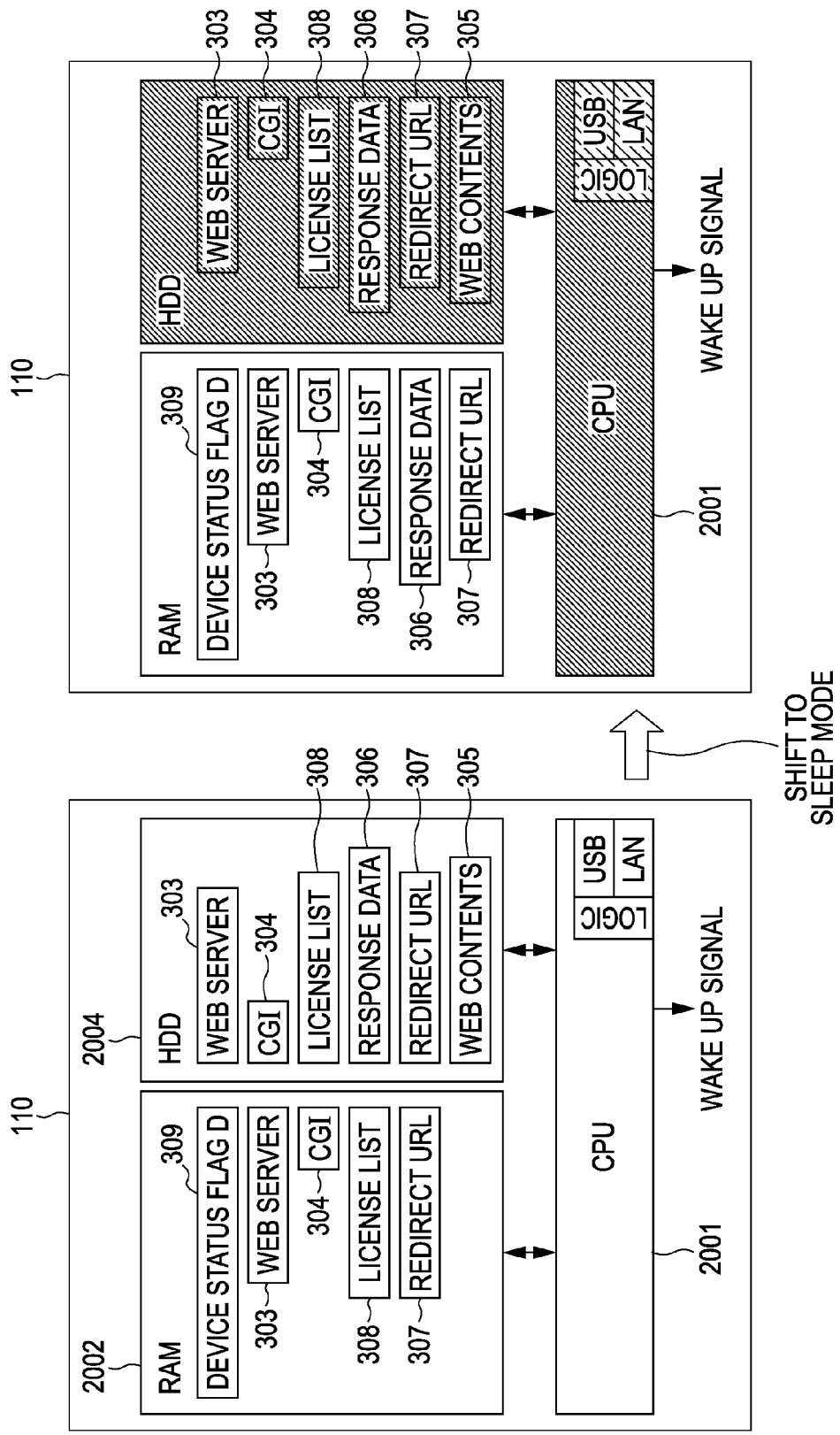

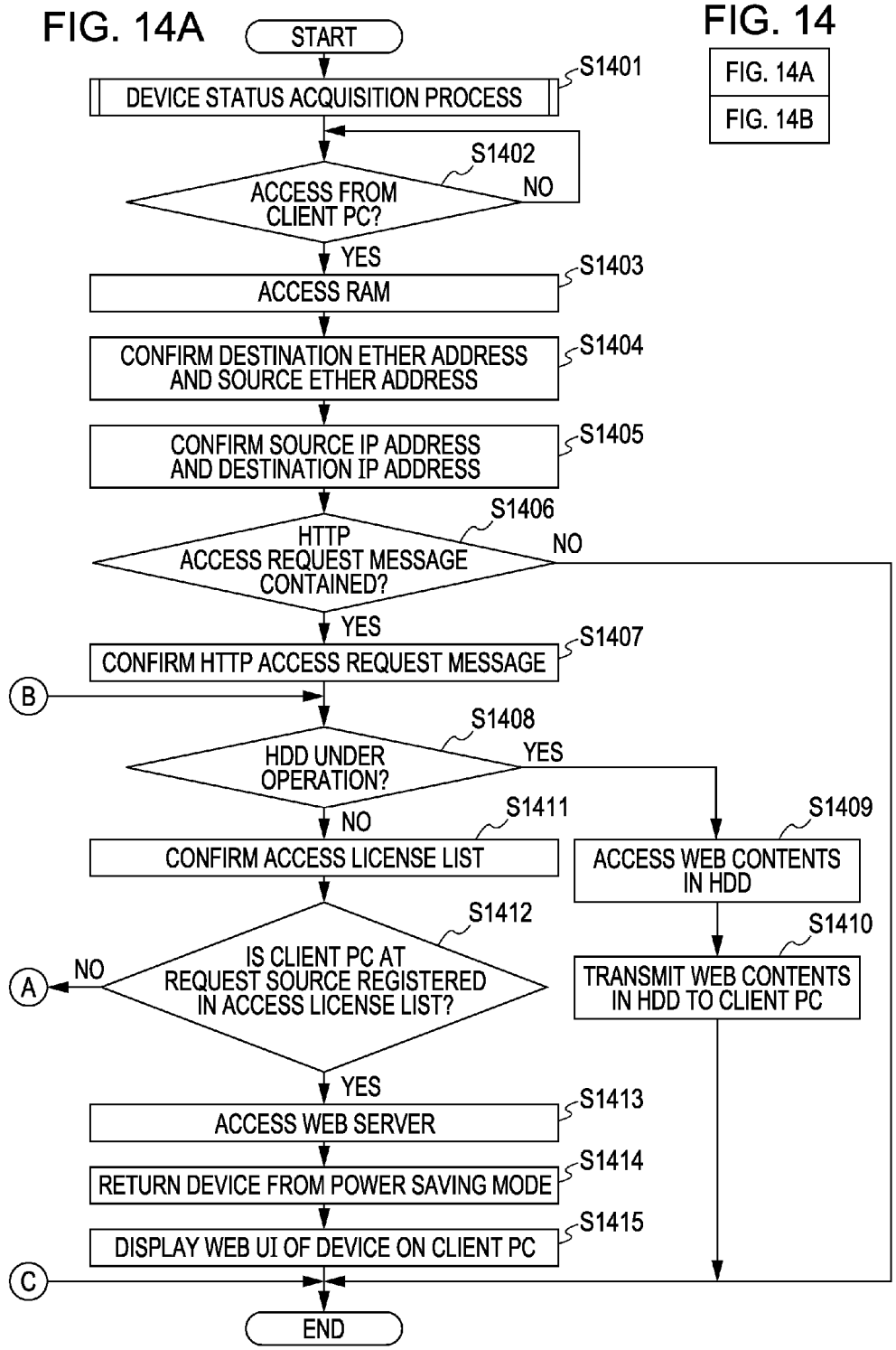

IMAGE FORMING APPARATUS AND METHOD FOR RESPONDING TO ACCESS REQUEST

BACKGROUND OF THE INVENTION

1. Field of the Invention

The present invention relates to an image forming apparatus and a method for responding to an access request. More particularly, the present invention is used to accept an access request from a client terminal when an external storage is not operated.

2. Description of the Related Art

Recently, a digital composite machine, such as a multi-function printer, having a network printing function, a facsimile function, a copying function, etc. has been developed with more sophisticated functions. For example, one of the known digital composite machines has the function of acquiring a document via the Internet and printing the document. Many of the various functions are realized with various programs, and a nonvolatile storage having a certain level of capacity, e.g., a hard disk (HDD), is required as a unit for storing those programs.

In the above described digital composite machines, there is known a technique for, when a power consumption mode is shifted from a power saving mode (sleep mode) to an ordinary mode, reading control data (such as a main program), which is used to control an image forming apparatus, from a volatile storage unit (such as a SDRAM) differing from a nonvolatile storage unit (such as a HDD) (see Japanese Patent Laid-Open No. 2005-193652). The known technique enables high-speed return from the power saving mode to the ordinary mode.

Some network image forming apparatuses having an ordinary mode and a power saving mode (1W Sleep) incorporate a Web UI (remote UI) for confirming and managing the state and information of the image forming apparatus from a remote location.

In the Web UI providing a UI (User Interface) in HTML (Hyper Text Markup Language), the HTML contents are stored in a HDD of the image forming apparatus. For that reason, the following problem occurs with the related art when the Web UI is used by a client PC. For information that can be acquired without activating the HDD, the image forming apparatus has to acquire the information by accessing the HDD and activating it each time the Web UI is used by the client PC. In other words, even if a user wants information that is not stored in the HDD of the related art image forming apparatus, the image forming apparatus is required to access the HDD and activate it each time the WEB UI is used by the client PC, because the HTML contents are stored in the HDD.

Accordingly, the image forming apparatus in the power saving mode is returned from the power saving mode to the ordinary mode. Further, the Web UI is in general used by a plurality of client PCs. In such a situation, when the image forming apparatus accepts all accesses from the plurality of client PCs as they are, it cannot maintain the power saving mode. This causes the problem that power consumption of the image forming apparatus is increased and the useful life of the HDD is shortened due to more frequent activation of the HDD.

SUMMARY OF THE INVENTION

In view of the above-described problems, the present invention provides an image forming apparatus which can be returned from a state operating with lower power consumption to an ordinary operating state, for example, by avoiding a particular section of the image forming apparatus from being returned from the power saving state at more frequency than an essentially necessary level.

In one aspect of the present invention, an image forming apparatus includes an external storage configured to store ordinary display data used to respond to an access request from a client terminal and simplified display data used to respond to the access request, a main storage configured to temporarily store the simplified display data, an accepting unit configured to accept the access request, a determining unit configured to determine whether a power consumption state is in a power saving state or an ordinary power consumption state when the accepting unit accepts the access request, a first responding unit configured to respond to the access request by using the simplified display data temporarily stored in the main storage without operating the external storage when the determining unit determines the power consumption state is in the power saving state, and a second responding unit configured to respond to the access request from the client terminal by using the ordinary display data stored in the external storage which is under operation when the determining unit determines the power consumption state is in the ordinary power consumption state.

By avoiding the particular section of the image forming apparatus from being returned from the power saving state at more frequency than that essentially required, the image forming apparatus can be returned from the state operating with lower power consumption to the ordinary operating state.

More specifically, activation of the external storage from the power saving state in response to various access from the client terminal for each access can be avoided. It is therefore possible to reduce the power consumption of the image forming apparatus and to prolong the useful life of the external storage.

Further features of the present invention will become apparent from the following description of exemplary embodiments with reference to the attached drawings.

BRIEF DESCRIPTION OF THE DRAWINGS

FIGS. 4A-4D illustrate changes of power consumption and hardware component states of the image forming apparatus according to the first exemplary embodiment.

FIGS. 11A-11D illustrate an example of the states of hardware components of an image forming apparatus according to the secondary exemplary embodiment.

FIGS. 12A and 12B illustrate an example of data stored in the image forming apparatus according to the second exemplary embodiment.

FIGS. 14A and 14B are flowcharts illustrating an example of processing executed by the image forming apparatus when the PC client accesses the image forming apparatus according to the second exemplary embodiment.

DESCRIPTION OF THE EMBODIMENTS

Figure 1:
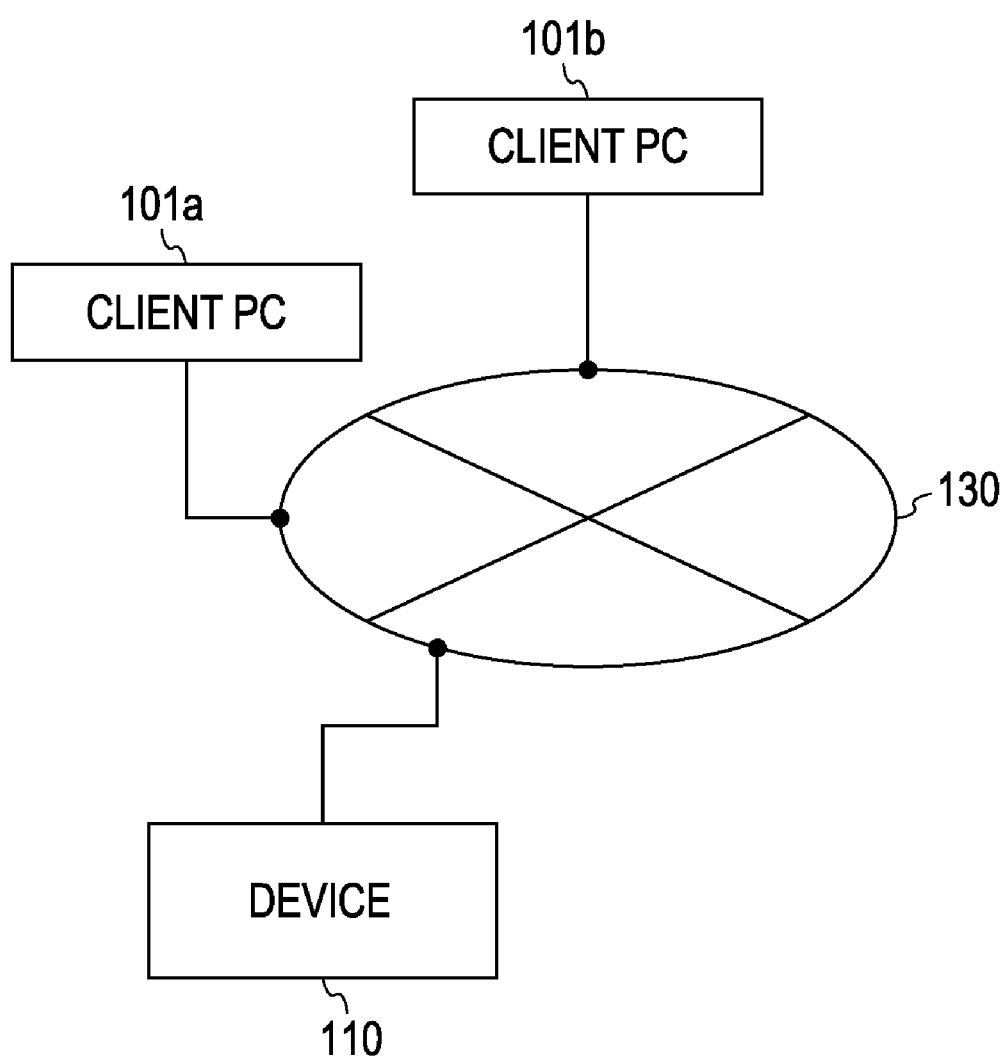
FIG. 1 illustrates an example of a network system configuration according to a first exemplary embodiment of the present invention.

A first exemplary embodiment of the present invention will be described below with reference to the drawings. FIG. 1 illustrates of an example of the configuration of a network system according to the present embodiment.

Referring to FIG. 1, the network system is includes client PCs 101a and 101b and an image forming apparatus (hereinafter referred to simply as a "device") 110, which are interconnected via the Internet 130. While FIG. 1 illustrates a network system with two client PCs and one device, the number of client PCs and devices is not limited to a particular amount. In addition to being connected via the Internet 130, the client PCs 101a and 101b and the device 110 can also be connected via a LAN (Local Area Network).

The client PC 101 is an information processing apparatus used by a user to access and use the device 110. The user of the client PC 101 can manage the status of the device 110 by utilizing a Web UI (remote UI) with a Web browser.

In the present embodiment, a digital composite machine in the form of an MFP (multifunction printer) is employed as an example of the device 110. The device 110 serving as the MFP includes the functions of a printer, a facsimile, and a copy machine. The device 110 can also operate in two modes, i.e., an ordinary mode and a power saving mode (sleep mode). The term "power saving mode (sleep mode)" used herein means a mode in which the device 110 is operated with lower power consumption than that in the ordinary mode.

In the ordinary mode, a HDD 2004 (see FIG. 2) is operated, while in the power saving mode, the HDD 2004 is not operated. For example, the device 110 is shifted from the ordinary mode to the power saving mode when no information is input for a certain period of time. When any information is input, the device 110 returns to the ordinary mode. A return to ordinary mode can be caused by, for example, a print request and a read request for contents stored in the HDD.

Figure 2:
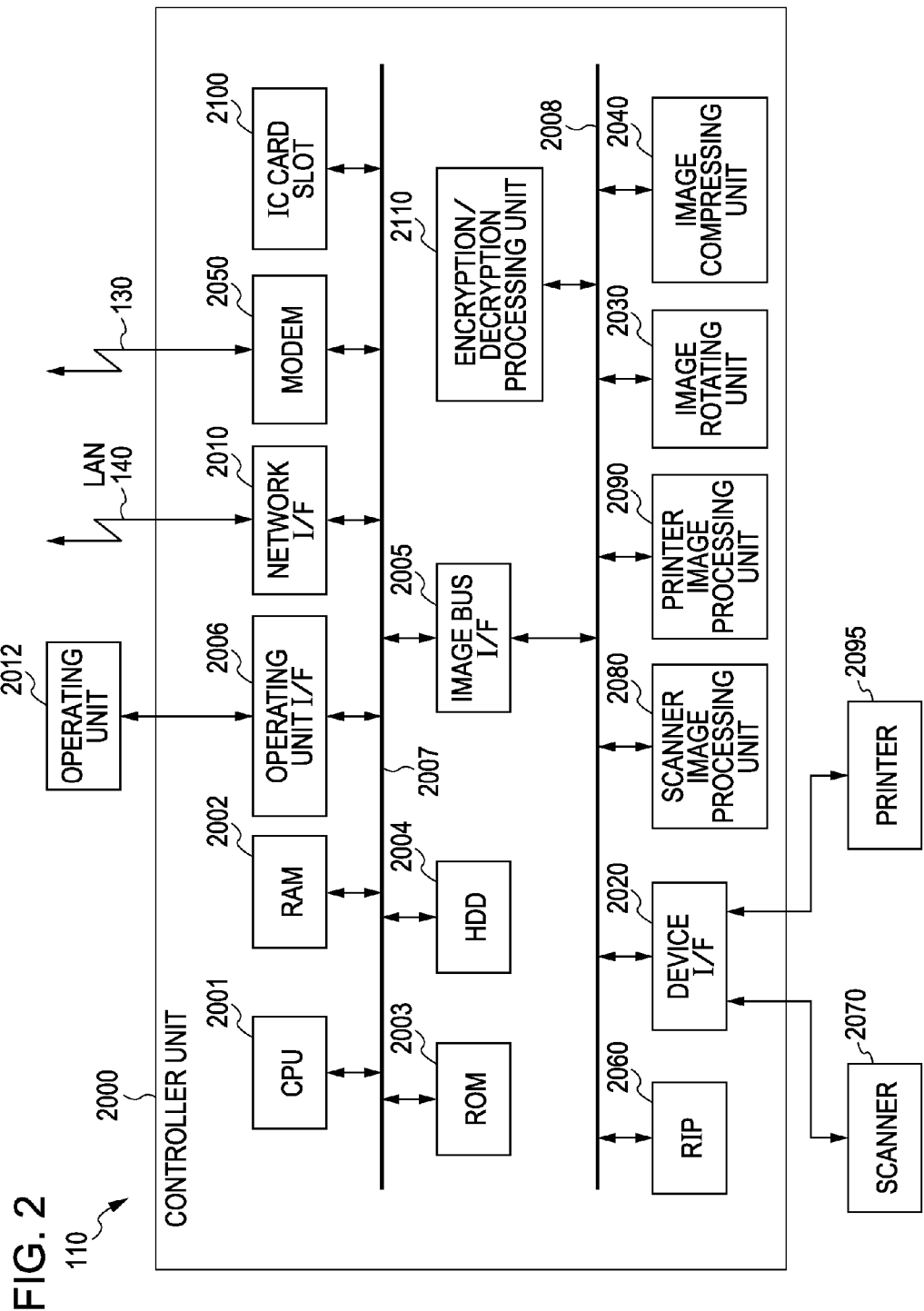
FIG. 2 illustrates an example of a configuration of an image forming apparatus according to the first exemplary embodiment.

Next, the configuration of the device 110 will be described. FIG. 2 is a block diagram illustrating an example of the configuration of the device 110.

Referring to FIG. 2, a controller unit 2000 is connected to a scanner 2070 serving as an image input device and to a printer 2095 serving as an image output device. The controller unit 2000 is also connected to a LAN 140 and the Internet 130. The controller unit 2000 includes a copying function, a printer function of outputting data externally supplied via the LAN 140, and a communication function including a facsimile function of transmitting and receiving data via a public line. Thus, the controller unit 2000 executes overall control of the device 110 and control for inputting/outputting of image information and device information.

A CPU 2001 serves as a controller for controlling the overall system. A RAM 2002 serves as a system work memory for the operation of the CPU 2001, as well as an image memory for temporarily storing image data. A ROM 2003 serves as a boot ROM in which is stored a system boot program. A HDD 2004 is a hard disk drive which stores system software, various programs, image data, etc. The CPU 2001 starts up the system in accordance with the boot program stored in the ROM 2003, reads various control programs stored in the HDD 2004, and executes necessary processing on the system while using the RAM 2002 as a work area.

In addition to the RAM 2002, the ROM 2003 and the HDD 2004, an operating unit I/F 2006, a network (LAN) I/F 2010, a modem 2050, an IC card slot 2100, and an image bus I/F 2005 are also connected to the CPU 2001 via a system bus 2007.

The operating unit I/F 2006 serves as an interface with respect to an operating unit 2012. The operating unit I/F 2006 transfers, to the operating unit 2012, image data that is to be displayed in the operating unit 2012. Also, the operating unit I/F 2006 transfers, to the CPU 2001, a signal generated with an input operation made on the operating unit 2012. The operating unit 2012 includes a display section, e.g., a screen, for displaying currently set states of various functions regarding image formation and an information entry screen for inputting setting information with respect to various functions. In addition, the display section includes a touch panel. The operating unit 2012 also includes an input section including keys used to input the setting information with respect to the various functions.

The network I/F 2010 is connected to the LAN 140 and performs inputting/outputting of information via the LAN 140. The modem 2050 is connected to the Internet 130 and performs inputting/outputting of information via the Internet 130. The IC card slot 2100 operates such that when an IC card is inserted in the IC card slot 2100, information in the IC card is output to the system bus 2007. For example, a proper PIN (Personal Identifier Number) is input through the IC card slot 2100 after the IC card has been inserted in the IC card slot 2100. A key used for encryption/decryption can be thereby input and output.

The image bus I/F 2005 interconnects an image bus 2008 and the system bus 2007. The image bus I/F 2005 includes a bus bridge for converting a data structure so that a block connected to the image bus 2008 and a block connected to the system bus 2007 are able to use data in common. The image bus 2008 is constituted by a PCI (Peripheral Component Interconnect) bus capable of transferring image data at a high speed, or by a bus in accordance with IEEE1394.

Connected to the image bus 2008 are a RIP (Raster Image Processor) 2060, a device I/F 2020, a scanner image processing unit 2080, a printer image processing unit 2090, an image rotating unit 2030, an encryption/decryption processing unit 2110, and an image compressing unit 2040.

The RIP 2060 develops PDL (Page Description Language) code into a bitmap image. The device I/F 2020 connects an image input/output device, i.e., the scanner 2070 and the printer 2095, with the controller unit 2000, and executes synchronous/asynchronous conversion of image data. The scanner image processing unit 2080 executes correction, retouch, editing, etc. with respect to the input image data. The printer image processing unit 2090 executes printer correction, resolution conversion, etc. with respect to the print output image data. The image rotating unit 2030 executes a rotation process for the image data. The image compressing unit 2040 executes a compression process for multi-value image data in accordance with JPEG, and a compression/expansion process on binary image data in accordance with JBEG, MMR or MH. The encryption/decryption processing unit 2110 is a hardware accelerator board for executing a data encryption/decryption process by using the key input through the IC card slot 2100.

As described above, the CPU 2001 controls accesses to and from the various devices connected to the system bus 2007 in accordance with various control programs. Further, the CPU 2001 executes control for reading image information from the scanner 2070 via the device I/F 2002, executing a predetermined process for the read image information, and outputting the processed image information to the printer 2095 via the device I/F 2020.

Figure 3:
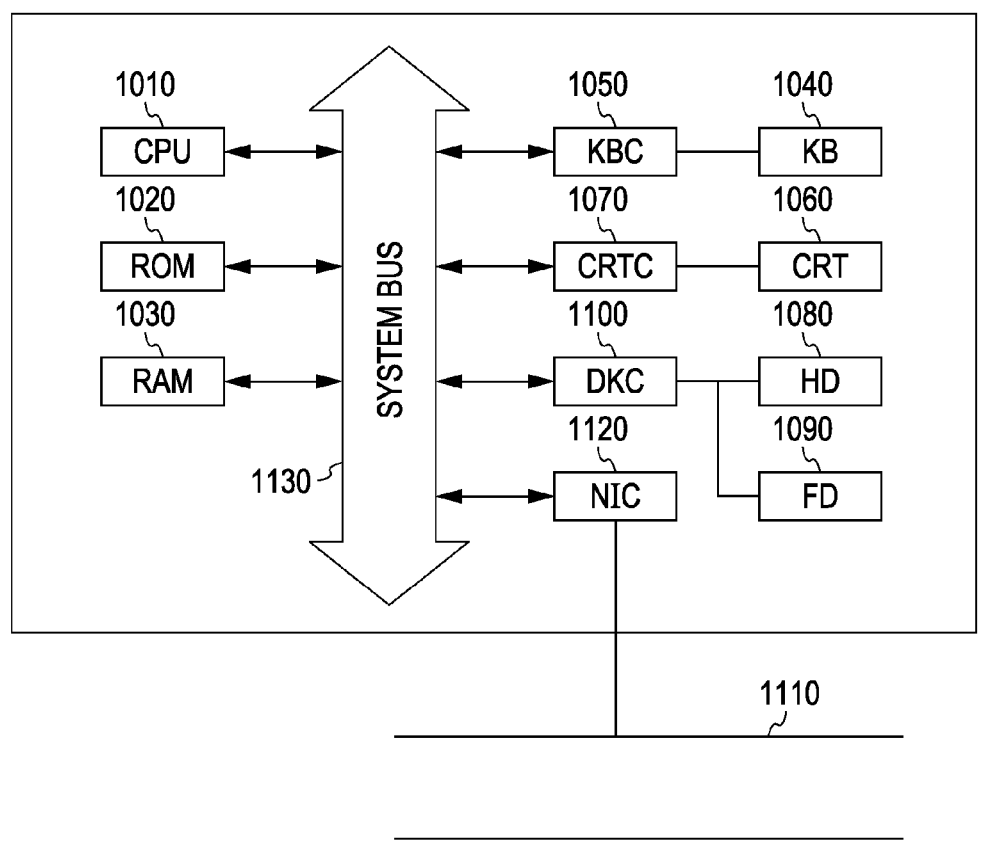
FIG. 3 is a block diagram illustrating an example of a configuration of a client PC according to the first exemplary embodiment.

Next, the configuration of the client PC 101 will be described. FIG. 3 is a block diagram illustrating an example of the configuration of the client PC 101.

Referring to FIG. 3, a CPU 1010, a ROM 1020, a RAM 1030, and a keyboard controller (KBC) 1050 for a keyboard (KB) 1040 are connected to a system bus 1130. A CRT controller (CRTC) 1070 for a CRT display (CRT) 1060, serving as a display unit, is also connected to the system bus 1130. Further, a disk controller (DKC) 1100 for a hard disk (HD) 1080 and a floppy disk (FD) 1090 are connected to the system bus 1130. In addition, a network interface controller (NIC) 1120 for connection to a network 1110 is connected to the system bus 1130.

The CPU 1010 executes software stored in the ROM 1020 or the HD 1080, or software supplied from the FD 1090, thereby controlling the various components connected to the system bus 1130. In other words, the CPU 1010 performs control for realizing operations performed by reading processing programs from the ROM 1020, the HD 1080 or the FD 1090 in accordance with predetermined processing sequences, and executing the programs.

The RAM 1030 functions, for example, as a main memory or a work area for the CPU 1010. The KBC 1050 controls instruction inputs from the KB 1040 or a pointing device (not shown). The CRTC 1070 controls display presented on the CRT 1060. The DKC 1100 controls accesses to the HD 1080 and the FD 1090, which store a boot program, various applications, an editing file, a user file, a network management program, predetermined processing programs used in this present embodiment, etc. The NIC 1120 is used to send and receive data to and from devices or systems on the network 1110 via two-way communication.

FIGS. 4A-4D illustrate respective changes of power consumption and states of hardware components in various statuses of the device 110.

Figure 4A:
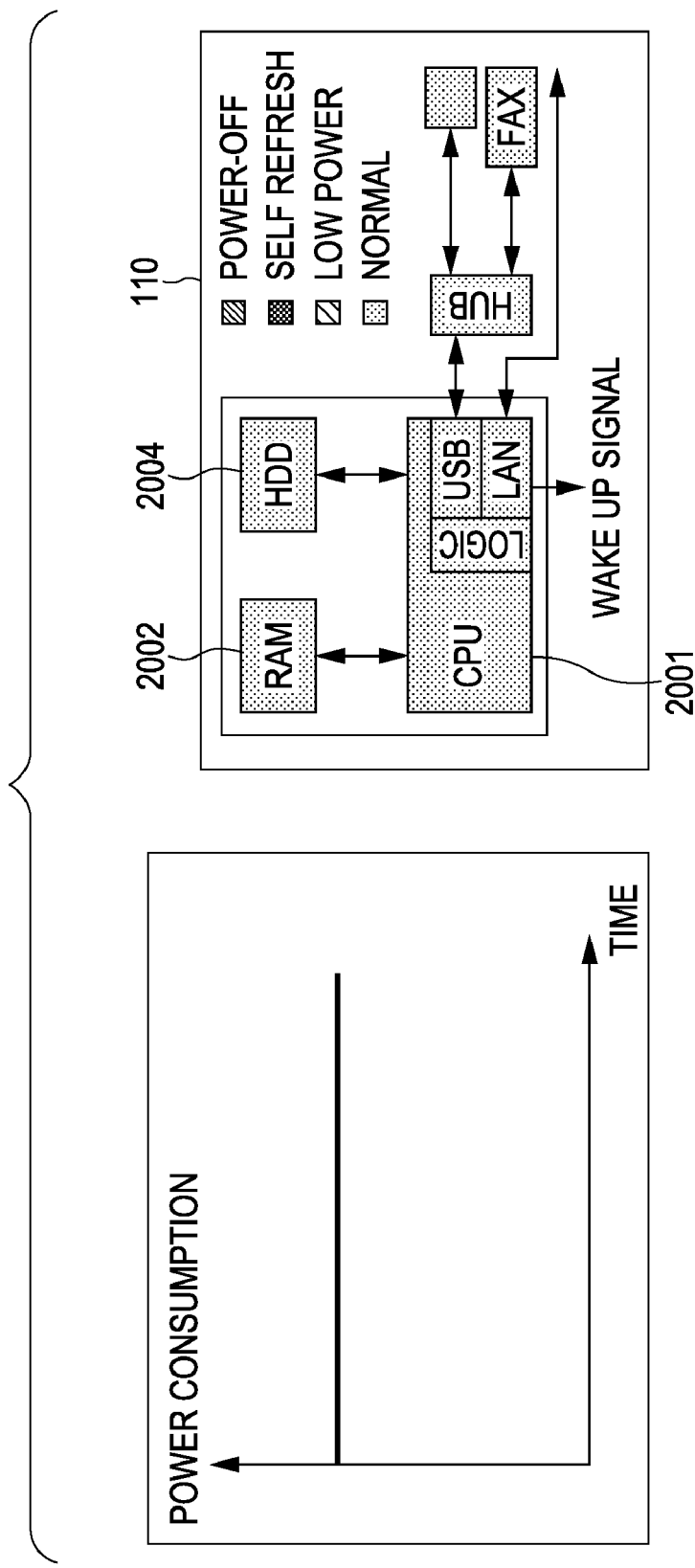

As illustrated in FIG. 4A, when the device 110 is operated in the ordinary mode, the hardware components of the device 110 are all brought into an activated state. As illustrated in FIG. 4B, when the device 110 is operated in the power saving mode, the HDD 2004 and the CPU 2001 are brought into a power-off state. Activation from the power saving mode can be performed with our without supplying power to the HDD 2004.

At the activation with power supplied to the HDD 2004, as illustrated in FIG. 4C, the device 110 is shifted to the ordinary mode. On the other hand, at the activation with no power supplied to the HDD 2004, as illustrated in FIG. 4D, the hardware components other than the HDD 2004 are brought into the activated state, while the HDD 2004 remains in the power-off state. Note that the power-off state is not necessarily required herein to be identical to a state where a main power source of the device is mechanically cut off, and it may be a state corresponding to, e.g., the power saving ("Low Power") mode.

Figure 5A:
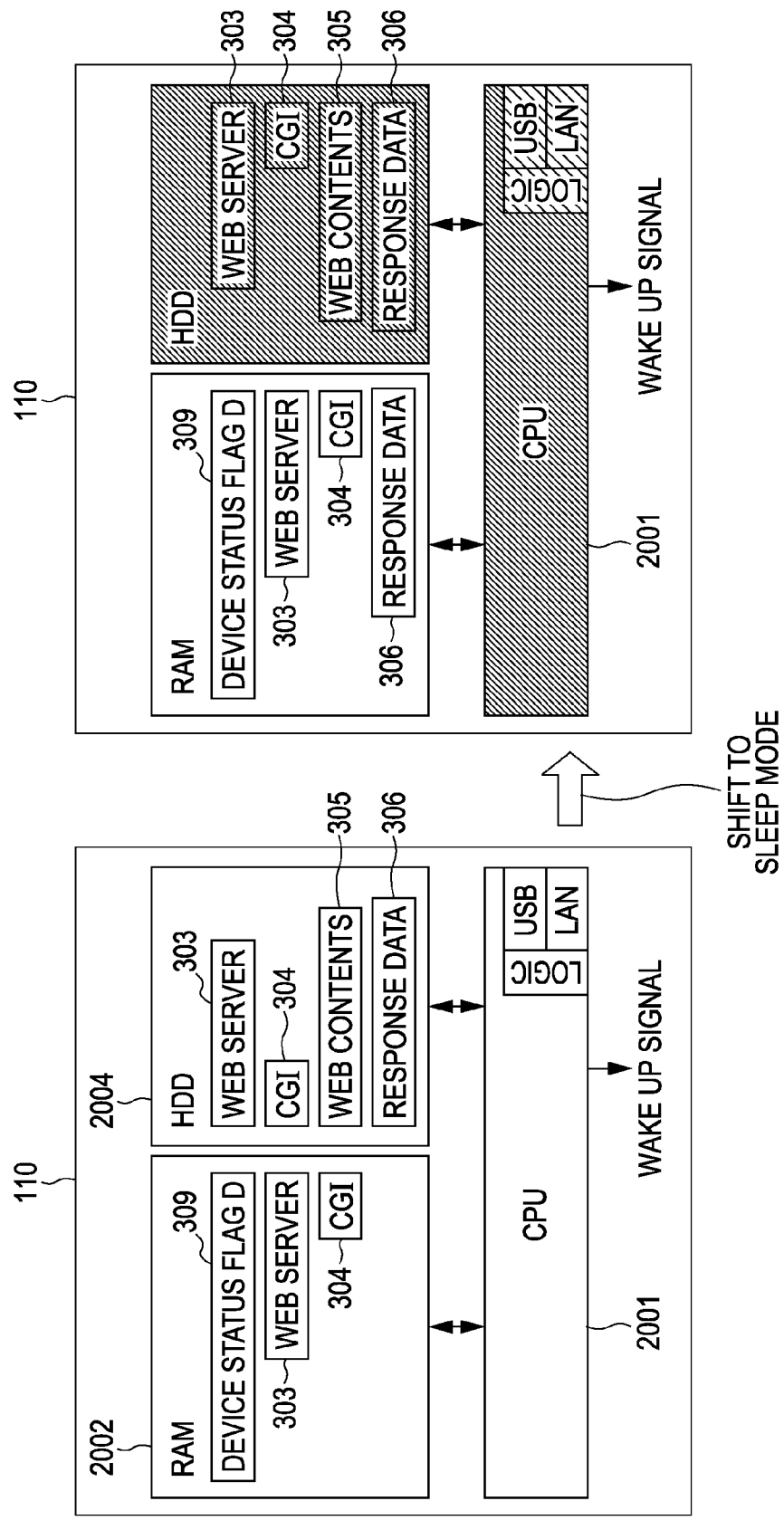
FIGS. 5A and 5B illustrate an example of data stored in the image forming apparatus of the first exemplary embodiment.
Figure 5B:
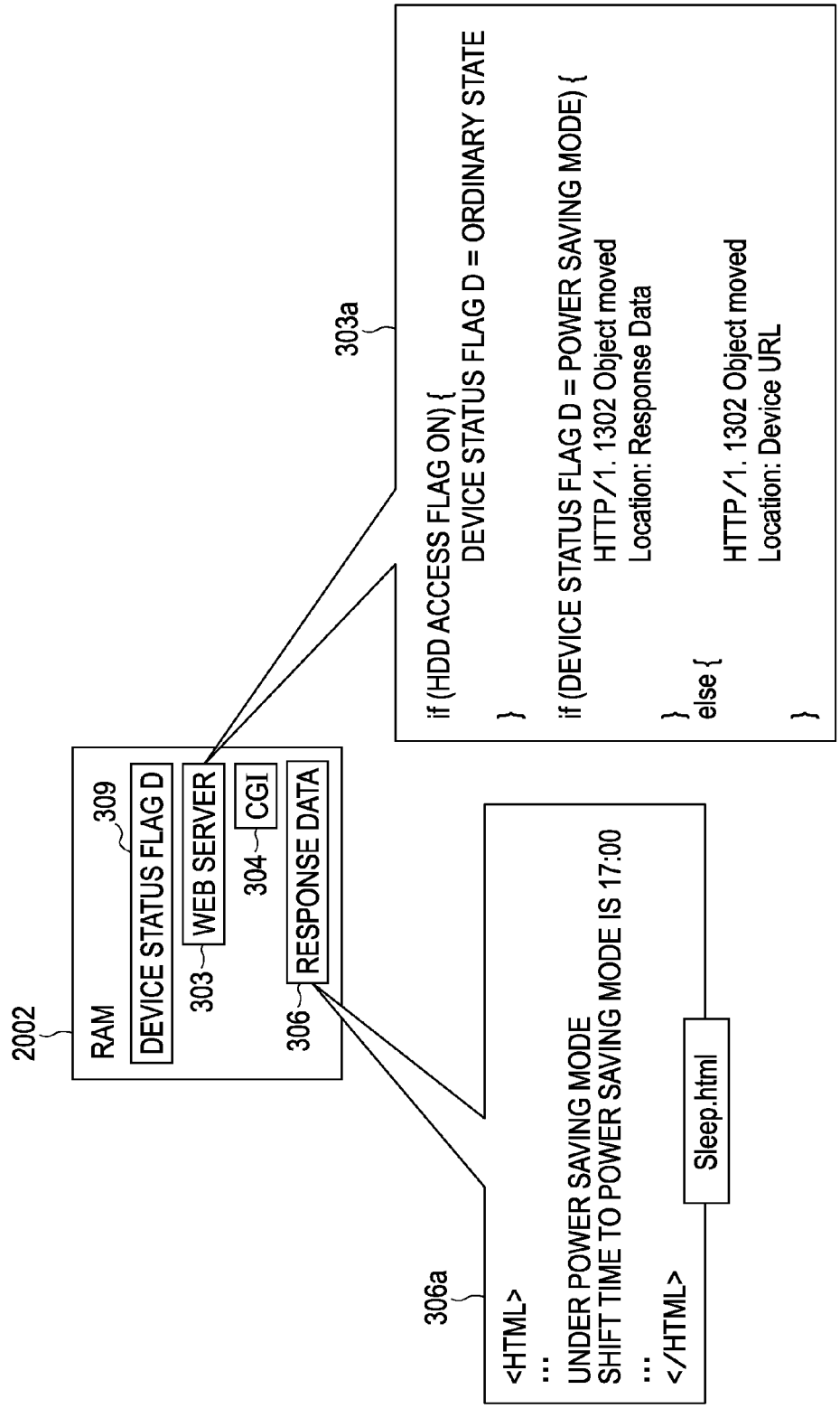

FIGS. 5A and 5B illustrate an example of data stored in the RAM 2002 and the HDD 2004 of the device 110.

As illustrated in FIG. 5A, a Web server program 303 and a CGI (Common Gateway Interface) program 304 are stored in the HDD 2004. Note that, in the following description, the Web server program 303 and the CGI program 304 are referred to simply as the Web server 303 and the CGI 304 respectively. Web contents 305 made of HyperText Markup Language (HTML) data and message notification HTML data (Response Data) 306 are further stored in the HDD 2004. The present embodiment is not limited to HTML, and any other markup language that would enable practice of the present invention is applicable.

When the device 110 is powered on, the Web server 303, the CGI 304, and the message notification HTML data 306, which are stored in the HDD 2004, are loaded from the HDD 2004 into the RAM 2002 for storage therein. At that time, the status of a device status flag D 309 stored in the RAM 2002 is set to the ordinary mode. Additionally, when the device 110 is shifted to the power saving mode, the device status flag D 309 stored in the RAM 2002 is set to the power saving mode.

When the device 110 is shifted to the power saving mode, information 306a indicating the status of the device 110 is added to the message notification HTML data 306 having been stored in the RAM 2002 at the startup of the device 110 (see FIG. 5B). The information 306a indicating the status of the device 110 is, for example, a shift time to the power saving mode as illustrated in FIG. 5B. However, the information 306a indicating the status of the device 110 is not limited to the shift time to the power saving mode. For example, the information 306a can be consumable item information indicating the number of remaining sheets, the amount of remaining toner, etc. in the device 110 at the shift time to the power saving mode.

A program 303a in FIG. 5B illustrates one example describing the processing to be executed by the device 110 when a HTTP access request is issued from the client PC 101.

The message notification HTML data (Response Data) 306 is a description for notifying a request source of the fact that the device 110 is in the power saving mode, when the HTTP access request is issued from the client PC 101 while the device 110 is in the power saving mode. In other words, the message notification HTML data 306 in the present embodiment is display data simpler (smaller volume of data) than the Web contents 305 stored in the HDD 2004. Corresponding to the simplified display data 306, the Web contents 305 stored in the HDD 2004 will be referred to as the ordinary display data in some cases. By employing the message notification HTML data 306, the device 110 can respond to the HTTP access request from the client PC 101 without operating the HDD 2004.

As indicated by the program 303a in FIG. 5B, when the HTTP access request is input from the exterior, the Web server 303 stored in the RAM 2002 first determines whether the contents of the input request demand a HDD access flag to be turned ON. Herein, the case demanding the HDD access flag to be turned ON means the case where the operation of the HDD 2004 is required, such as when processing to access the HDD 2004 is executed in response to, for example, an operation made on the operating panel of the device 110 or inputting of a print job.

If the determination result indicates that the HDD access flag is demanded to be turned ON, the Web server 303 stored in the RAM 2002 sets the device status flag D 309 stored in the RAM 2002 to the ordinary mode state. On the other hand, if the determination result indicates that the HDD access flag is not demanded to be turned ON, the Web server 303 stored in the RAM 2002 keeps the device status flag D 309 in the same setting. Thus, when the HTTP access request is issued from the client PC 101, the Web server 303 stored in the RAM 2002 determines whether the status of the device status flag D 309 is in the ordinary mode or the power saving mode.

If the determination result indicates that the status of the device status flag D 309 is in the ordinary mode, the response process based on the data stored in the RAM 2002 is switched over to a response process based on the Web contents 305 held in the HDD 2004. Then, the Web server 303 executes processing to send back, as a response, the device URL to the HTTP access request source so that a Web UI based on the data held in the HDD 2004 of the device 110 is displayed to the client. Since the volume of the Web contents 305 is typically several tens of megabytes (MB) or more, loading all of the Web contents 305 into the RAM 2002 in advance is not practical. For that reason, an access to the HDD 2004 is required in the case of the response based on the Web contents 305.

If, on the other hand, the determination result indicates that the status of the device status flag D 309 is in the power saving mode, the Web server 303 stored in the RAM 2002 sends back, as a response, the message notification HTML data 306 held in the RAM 2002 of the device 110 to the request source.

Figure 6:
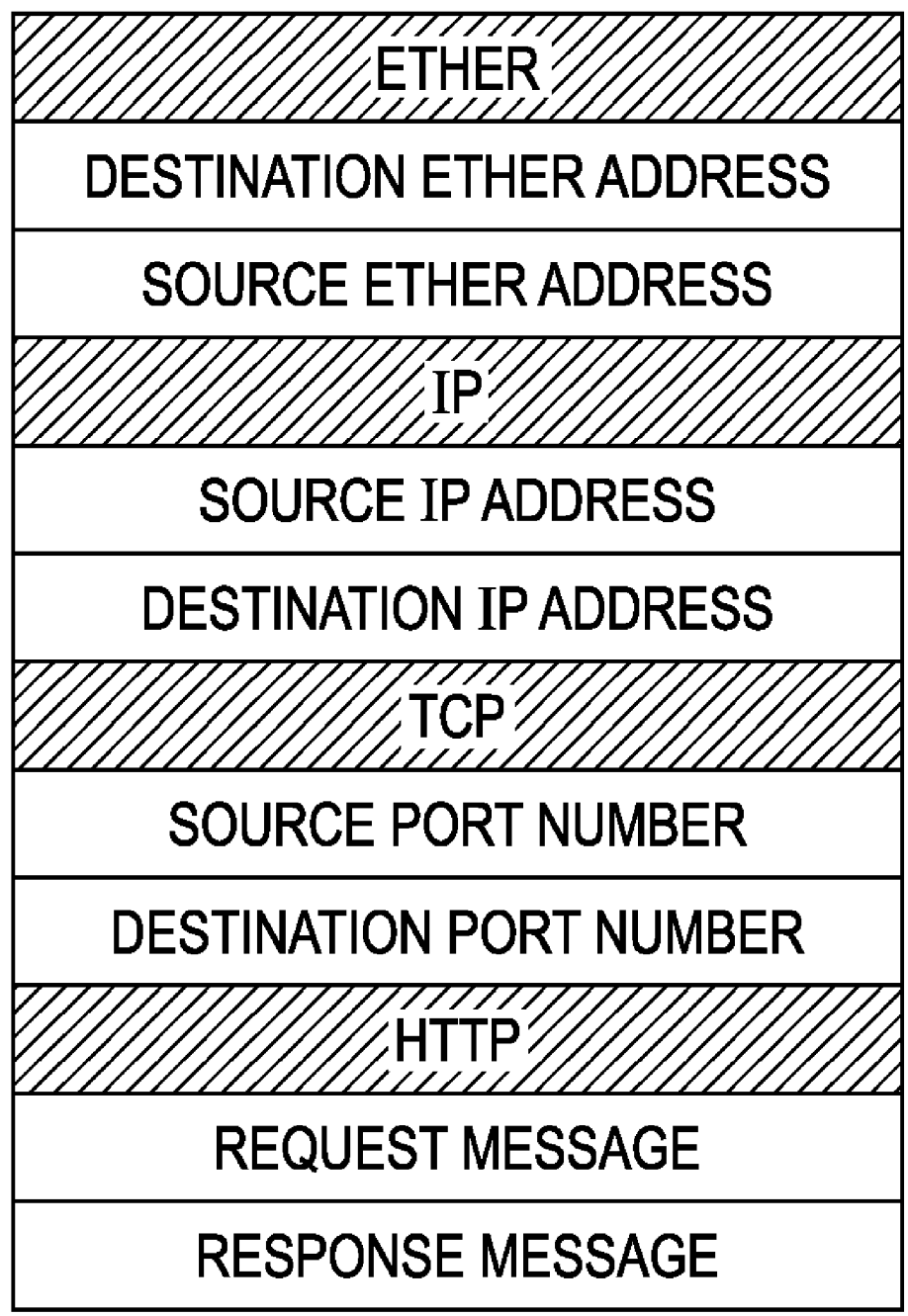
FIG. 6 illustrates an example of a pattern data input to the image forming apparatus according to the first exemplary embodiment.

FIG. 6 illustrates an example of pattern data input to the device 110 with an access from the exterior.

Based on destination information and source information which are contained in pattern data 600 of FIG. 6, the device 110 identifies the destination and the source. Then, the device 110 sends back a response to the HTTP access request based on the identified information and the setting information stored in the RAM 2002. In the present embodiment, the Web server 303 executes the identification of the pattern data 600 and the response to the HTTP access request.

Figure 7:
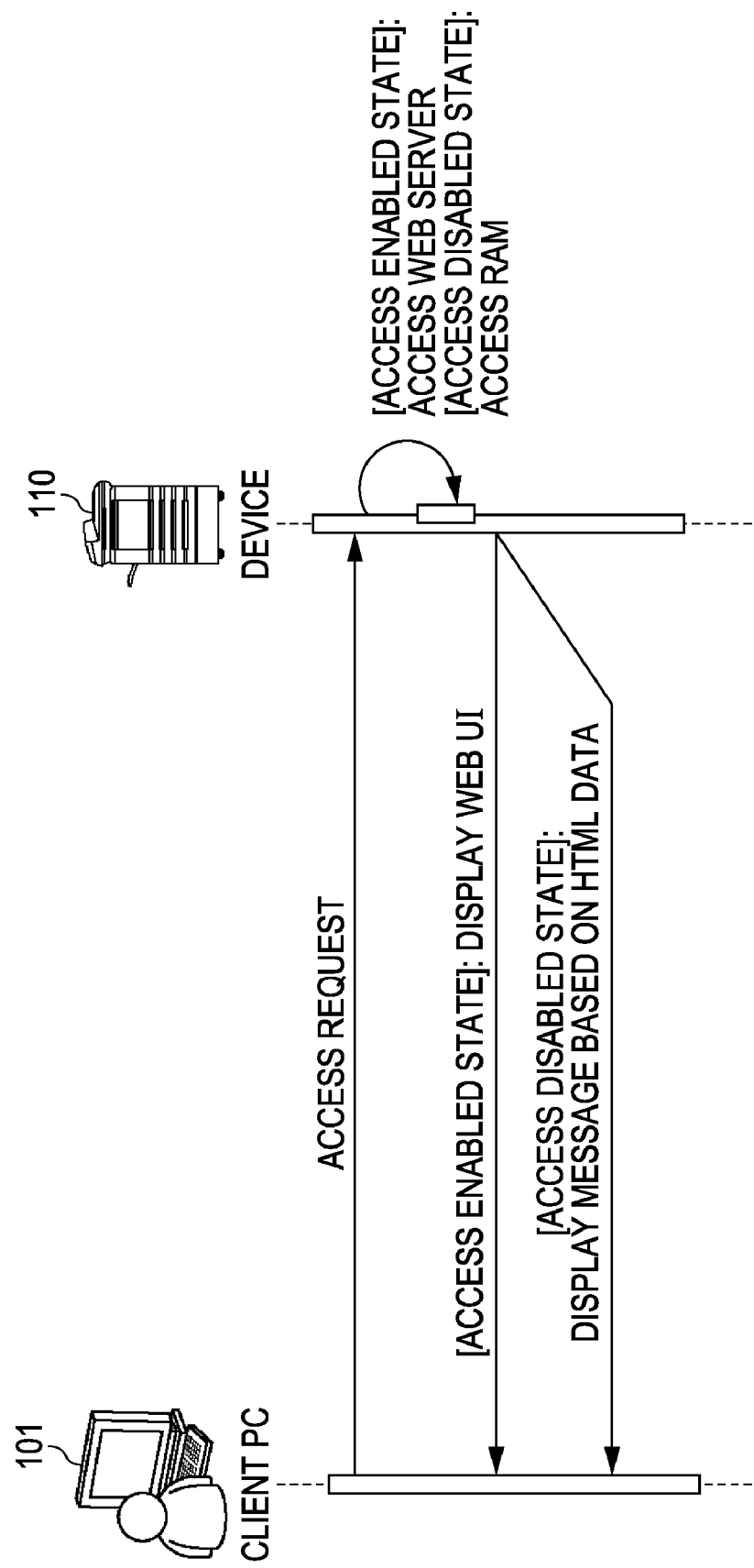
FIG. 7 illustrates an example of processing executed by the client PC and the image forming apparatus according to the first exemplary embodiment.
Figure 8:
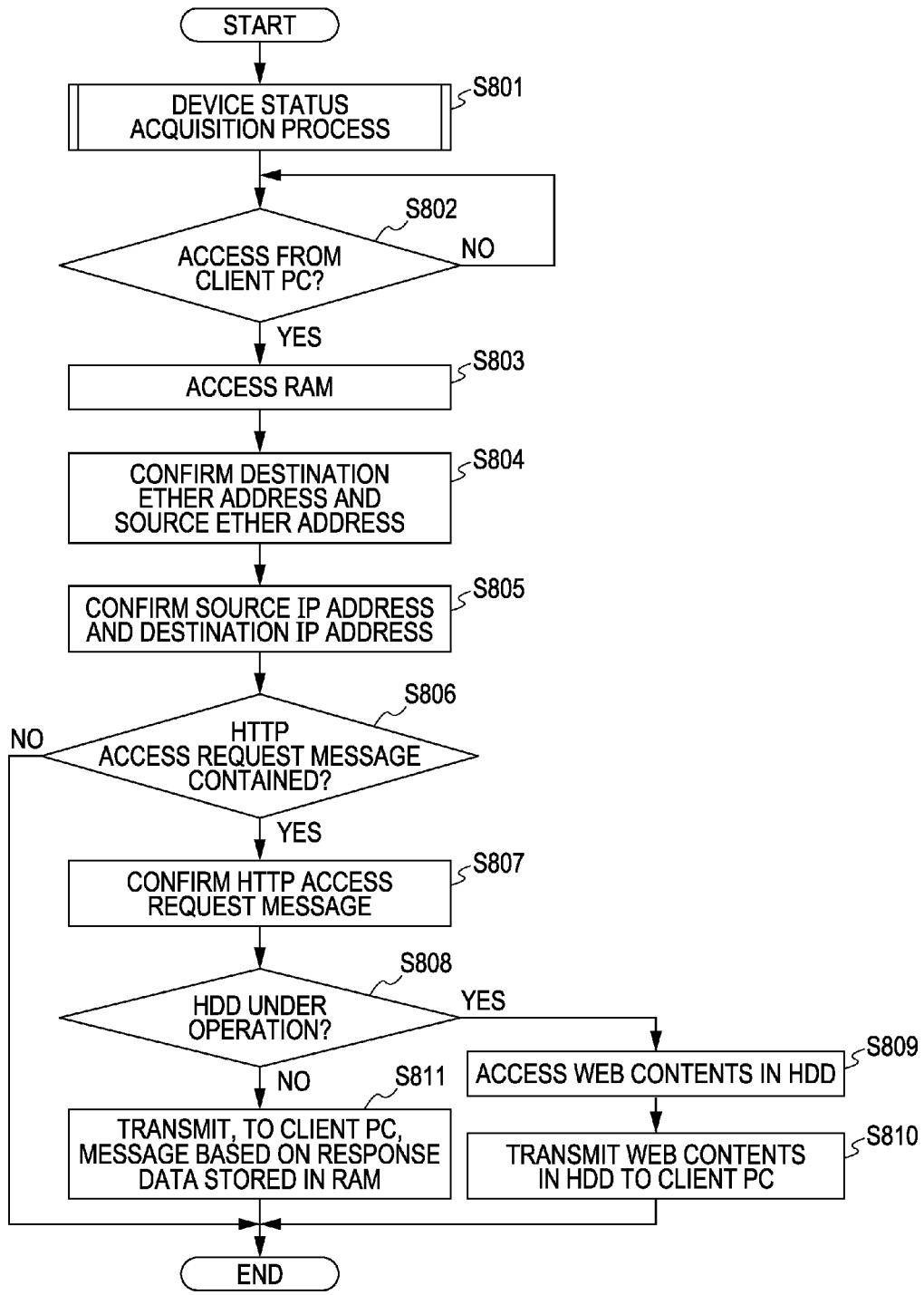
FIG. 8 is a flowchart illustrating an example of processing executed by the image forming apparatus according to the first exemplary embodiment when the PC client accesses the image forming apparatus.
Figure 9:
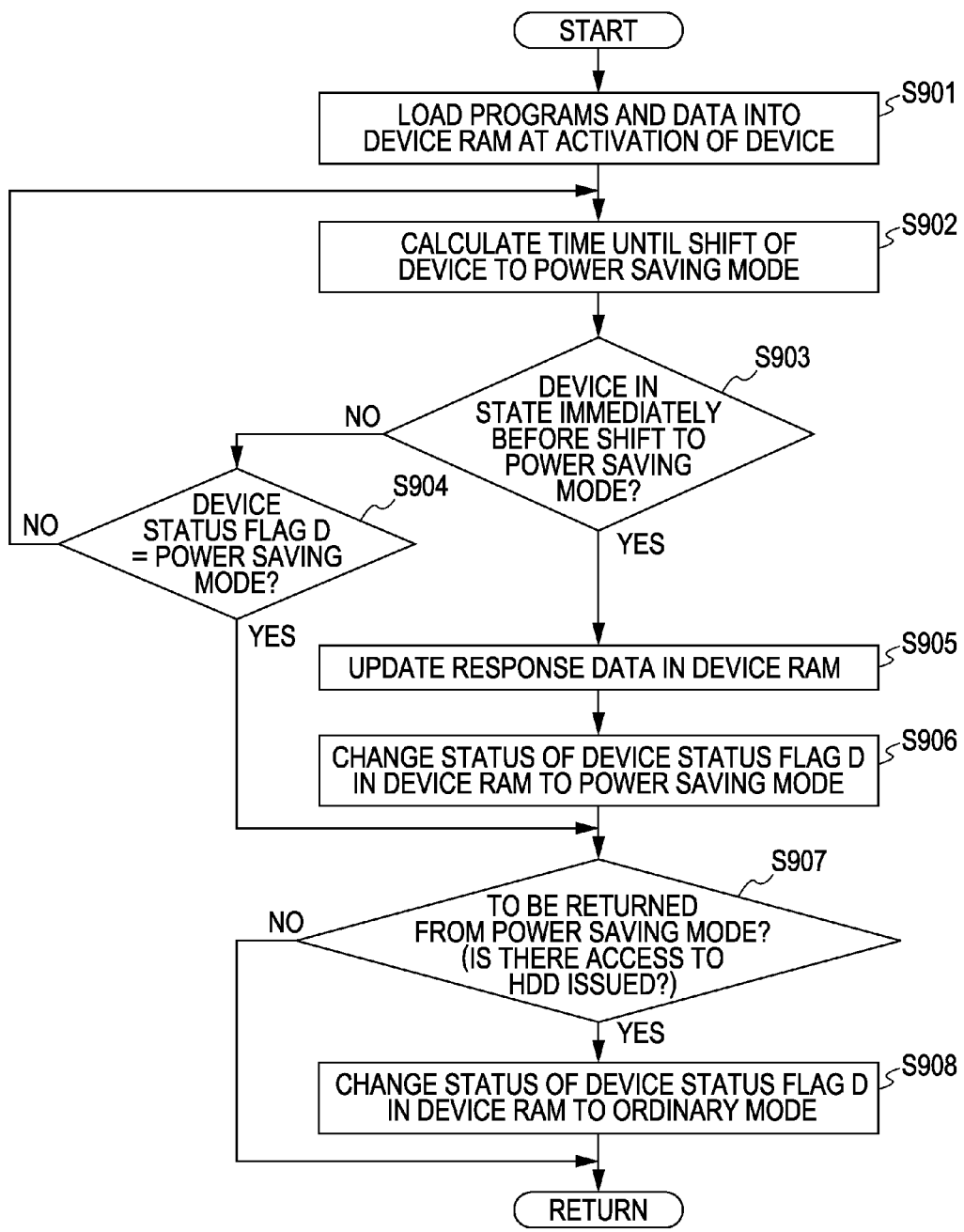
FIG. 9 is a flowchart illustrating an example of processing according to the first exemplary embodiment executed when the state of the image forming apparatus is stored in a RAM of the image forming apparatus.

FIGS. 7-9 illustrate an example of an operation performed in the network system when the client PC 101 accesses the device 110. FIG. 7 illustrates an example of processing executed by the client PC 101 and the device 110 when the client PC 101 accesses the device 110. FIG. 8 is a flowchart illustrating an example of processing executed by the device 110 when the client PC 101 accesses the device 110. FIG. 9 is a flowchart illustrating an example of processing (i.e., step S801 of FIG. 8) executed when the status of the device 110 is stored in the RAM 2002 of the device 110.

Turning to FIG. 8, in step S801, a device status acquisition process is performed in which the status of the device 110 is stored in the RAM 2002 (i.e., the status of the device status flag D 309 is set). Details of step S801 are provided below with reference to FIG. 9. In the device status acquisition process, the CPU 2001 acquires the state information from the printer 2095 and the scanner 2070 through the device I/F 2020 or acquires the state information from each block of the controller unit 2000. The state information includes, as described above, the power source state information, the consumable item information, etc. Further, the CPU 2001 executes a process for reflecting the acquired state information on the simplified display data.

Next, in step S802, the device 110 waits for an access from the client PC 101. If an access is issued from the client PC 101, the device 110 accepts the access request and proceeds to step S803, where the device 110 accesses the RAM 2002.

Then, in step S804, the device 110 confirms a destination ETHER address and a source ETHER address, which are contained in the pattern data 600. In step S805, the device 110 confirms a source IP address and a destination IP address, which are also contained in the pattern data 600.

Next, in step S806, the device 110 determines whether a HTTP access request message is contained in the pattern data 600. If the determination result indicates that the HTTP access request message is not contained in the pattern data 600, the processing ends. On the other hand, if the determination result indicates that the HTTP access request message is contained in the pattern data 600, the flow advances to step S807, where the device 110 confirms the HTTP access request message.

In step S808, the device 110 determines, based on the device status flag D 309, whether the device 110 is under the operation (i.e., in the ordinary mode). In other words, the device 110 determines the power consumption state in step S808, i.e., whether it is in the power saving state in which the HDD 2004 serving as an external storage is not operated or the ordinary power consumption state in which the HDD 2004 is operated (supplied with power).

If the determination result of step S808 indicates that the device 110 is under the operation, the flow advances to step S809. In step S809, the device 110 accesses the Web contents 305 stored in the HDD 2004 of the device 110. Stated another way, when the device 110 is determined as being in the ordinary power consumption state, it reads the ordinary display data stored in the HDD 2004 which is operating as the external storage.

Next, in step S810, the device 110 transmits display data for the Web UI of the device 110 to the client PC 101 in accordance with the processing of the Web server 303. As a result, the Web UI is displayed on the CRT display (CRT) 1060 of the client PC 101.

If it is determined in step S808 that the device 110 is not under the operation, i.e., when the device 110 is in the power saving state, the flow advances to step S811. In step S811, the device 110 accesses the message notification HTML data (Response Data) 306, which is temporarily stored in the RAM 2002 serving as a main storage, without accessing the HDD 2004 serving as the external storage.

Further, in step S811, the message notification HTML data 306 is transmitted to the client PC 101 in accordance with the processing executed by the Web server 303 which is held in the RAM 2002. As a result, data (information 306a indicating the status of the device 110) contained in the message notification HTML data 306 is displayed on the CRT display (CRT) 1060 of the client PC 101. On that occasion, it is assumed that a browser for displaying and viewing the HTML data transmitted from the device 110 is installed in the client PC 101. The term "browser" refers to software for viewing the contents of data and files. The HTML data displayed by the browser contains at least the above-described simplified display data and ordinary display data. Of course, other Internet HTML contents, etc. can also be displayed.

An example of the device status acquisition process in step S801 of FIG. 8 will now be described with reference to the flowchart of FIG. 9. While the flowchart of FIG. 9 describes the details of step S801, the processing of steps S902-S908 in FIG. 9 is executed in parallel to the determination process of step S802 in FIG. 8 in an asynchronous manner.

Turning to FIG. 9, in step S901, programs and data are loaded from the HDD 2004 into the RAM 2002 at the activation of the device 110. Herein, the activation of the device 110 includes the case of a shift to the state of FIG. 4C and the case where the device 110 is turned on via a main power source of the device 110.

Then, in step S902, a time until the shift of the device 110 to the power saving mode is calculated. A reference point for the calculation can be set to one of various suitable timings or conditions, e.g., timing at which an activation process is completed or timing at which a print job outputting process is completed. Based on the calculation result, it is determined in step S903 whether the device 110 is in a state immediately before the shift to the power saving mode. Herein, the wording "state immediately before the shift to the power saving mode" means a state where, after the shift of the device 110 to the ordinary mode, a predetermined time has lapsed in terms of the remaining time of the ordinary mode (i.e., the time until the shift to the power saving mode). As an alternative, the wording "state immediately before the shift to the power saving mode" can also mean a state where the shift of the device 110 from the ordinary mode to the power saving mode is just decided.

If it is determined in step S903 that the device 110 is in the state immediately before the shift to the power saving mode, the flow advances to step S905 to form the simplified display data. In step S905, the information 306a indicating the status of the device 110 is added to the message notification HTML data (Response Data) 306 loaded in the RAM 2002. As described above, the information 306a indicating the status of the device 110 can be, for example, the shift time to the power saving mode or the information of consumable items in the device 110 at the shift time to the power saving mode.

While the information 306a indicating the status of the device 110 is added to the message notification HTML data 306 having been loaded into the RAM 2002 in step S901, the processing is not necessarily limited to the above-described steps. For example, instead of loading the message notification HTML data 306 in step S901, the message notification HTML data 306 added with the information 306a indicating the status of the device 110 can be loaded into the RAM 2002 in step S905. In step S906, the device status flag D 309 in the RAM 2002 is changed to the power saving mode. Then, the flow advances to step S907.

If it is determined in step S903 that the device 110 is not in the state immediately before the shift to the power saving mode, the flow advances to step S904 to determine whether the device status flag D 309 is set to the power saving mode. If the determination result in step S904 indicates that the device status flag D 309 is not set to the power saving mode, the flow returns to step S902 to repeat the processing from step S902. If the determination result in step S904 indicates that the device status flag D 309 is set to the power saving mode, the flow advances to step S907.

In step S907, it is determined whether the device 110 is returned from the power saving mode. Herein, the wording "the device 110 is returned from the power saving mode" means a state where an access is issued to the HDD 2004 with a user's input operation made on the operating panel of the device 110, inputting of a print job, or an access request to the Web contents 305.

If the determination result in step S907 indicates that the device 110 is returned from the power saving mode, the device status flag D 309 in the RAM 2002 is changed to the ordinary mode in step S908. The flow then returns to the flowchart of FIG. 8. If, on the other hand, the determination result in step S907 indicates that the device 110 is not yet returned from the power saving mode, the flow returns directly to the flowchart of FIG. 8.

The processing of steps S902-S908 in FIG. 9 is executed, as described above, in parallel to the determination process of step S802 in FIG. 8 in an asynchronous manner. The determination process of step S808 in FIG. 8 is executed based on the processing of steps S902-S908 in FIG. 9.

Thus, in the present embodiment, when the device 110 is activated, the Web server 303, the CGI 1304 and the message notification HTML data 306, which are stored in the HDD 2004, are loaded from the HDD 2004 into the RAM 2002. Thereafter, the device status flag D 309 stored in the RAM 2002 is set to either the ordinary mode or the power saving mode depending on the status of the device 110.

When an HTTP access request is issued from the client PC 101 to the device 110, it is determined based on the device status flag D 309 whether the HDD 2004 is under the operation. If the determination result indicates that the HDD 2004 is not under the operation, the device 110 reads the message notification HTML data (Response Data) 306, which is held in the RAM 2002, to be ready for a response. Then, the device 110 sends back the message notification HTML data 306 to the client PC 101 in accordance with the processing executed by the Web server 303, thereby making a simplified response to the request from the client PC 101.

As a result, even when the device 110 is in the power saving mode in which the HDD 2004 is not operated, the user of the client PC 101 can confirm the status of the device 110 with no need of returning the device 110 from the power saving mode. This addresses the problem that the device 110 is returned to the ordinary mode each time an access is issued from the client PC 101 to the device 110, and the HDD 2004 is activated at more frequency than that essentially required. It is hence possible to reduce the power consumption of the device 110 and to prolong the useful life of the HDD 2004.

While the present embodiment has been described, by way of example, in connection with the case where the device 110 is a digital composite machine, the device 110 is not limited to the digital composite machine. The device 110 can be any type of image forming apparatus or device that would enable practice of the present invention. For example, the device 110 can be a printer or a copying machine.

Also, while the present embodiment has been described, by way of example, in connection with the case where the Web server 303 stored in the HDD 2004 is loaded into the RAM 2002 and the Web server 303 makes a response in the power saving mode, the present invention is not limited to such an example. In another embodiment, a sub-Web server can be loaded from the HDD 2004, which serves as the external storage, to form the simplified display data so that the simplified display data is stored in the RAM 2002.

In other words, at the shift to the power saving mode, a sub-Web server can be loaded into the RAM 2002, which is a simplified Web server different from the Web server 303 and has such a capability as enabling the device 110 to execute the processing of FIGS. 8 and 9 when a HTTP access request is issued from the client PC 101 to the device 110. A program describing the processing to be executed by the device 110 in response to the HTTP access request from the client PC 101 is, for example, the program 303a illustrated in FIG. 5B.

A second exemplary embodiment of the present invention will now be described. Note that in the following description of the present embodiment, the same parts as those in the first exemplary embodiment are denoted by the same reference numerals and a detailed description of those parts is omitted herein.

Figure 10:
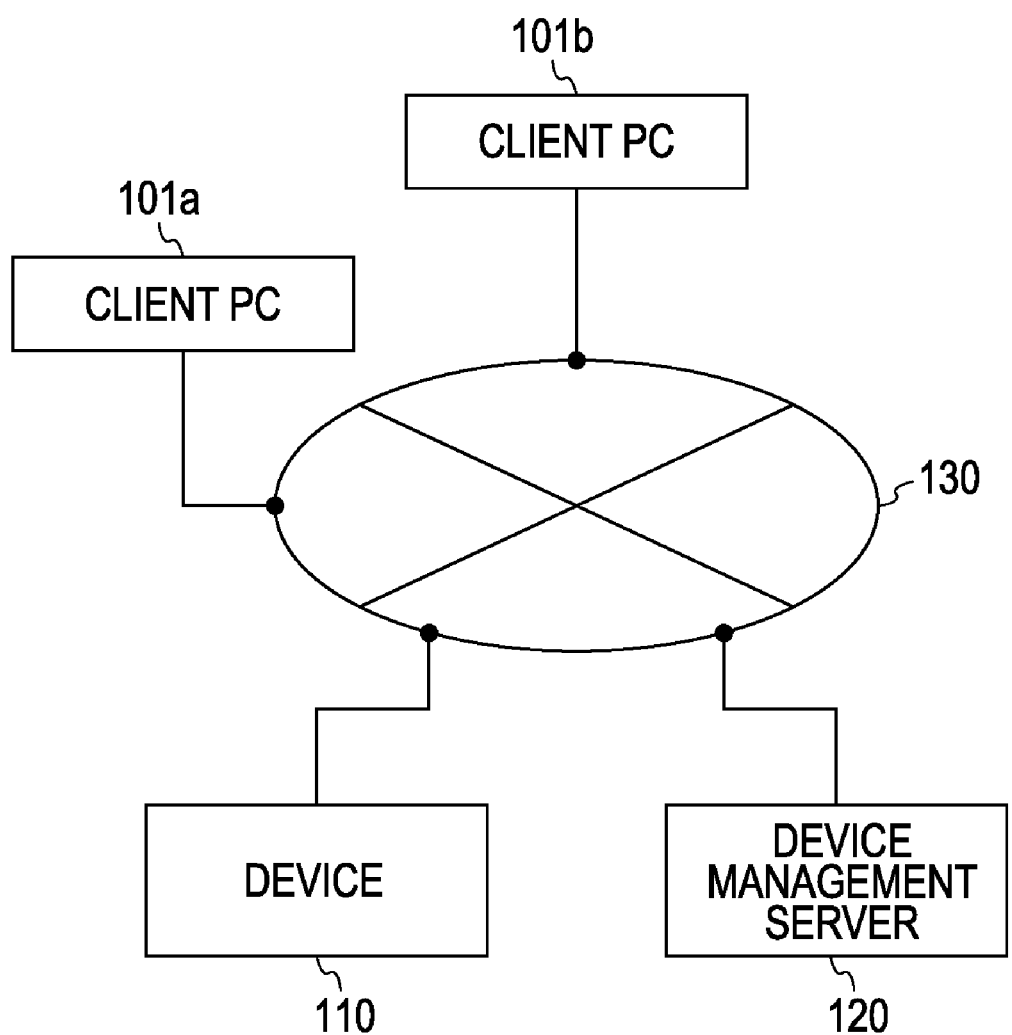
FIG. 10 illustrates an example of a network system configuration according to a second exemplary embodiment of the present invention.

FIG. 10 illustrates an example of a configuration of a network system according to the present embodiment.

Referring to FIG. 10, the network system is includes client PCs 101a and 101b, a device 110, and a device management server 120, which are interconnected via the Internet 130. While FIG. 10 illustrates, by way of example, the network system including two client PCs 101, one device 110, and one device management server 120, the number of client PCs, devices, and device management servers are not limited to any specific amount. Additionally, the client PCs 101a and 101b and the device 110 are interconnected via a LAN (Local Area Network).

The device management server 120 is an information processing apparatus for managing the device 110. The device management server 120 in the present embodiment performs management regarding, for example, whether the device 110 having shifted to the power saving mode is to be returned to the ordinary mode (i.e., whether the power saving mode is to be canceled). Because hardware of the device management server 120 can be realized with the hardware illustrated in FIG. 3, a description thereof is omitted here.

FIGS. 11A-11D illustrate examples of states of hardware components in various statuses of the device 110 according to the present embodiment.

As illustrated in FIG. 11A, when the device 110 is operated in the ordinary mode, the hardware components of the device 110 are all brought into an activated state. As illustrated in FIG. 11B, when the device 110 is operated in the power saving mode, the HDD 2004 and the CPU 2001 are brought into a power-off state. Activation from the power saving mode can be performed either with or without power being supplied to the HDD 2004.

At the activation with power supplied to the HDD 2004, as illustrated in FIG. 11C, the device 110 is shifted to the ordinary mode. On the other hand, at the activation with no power supplied to the HDD 2004, as illustrated in FIG. 11D, the hardware components other than the HDD 2004 are brought into the activated state, while the HDD 2004 remains in the power-off state.

Figure 12B:
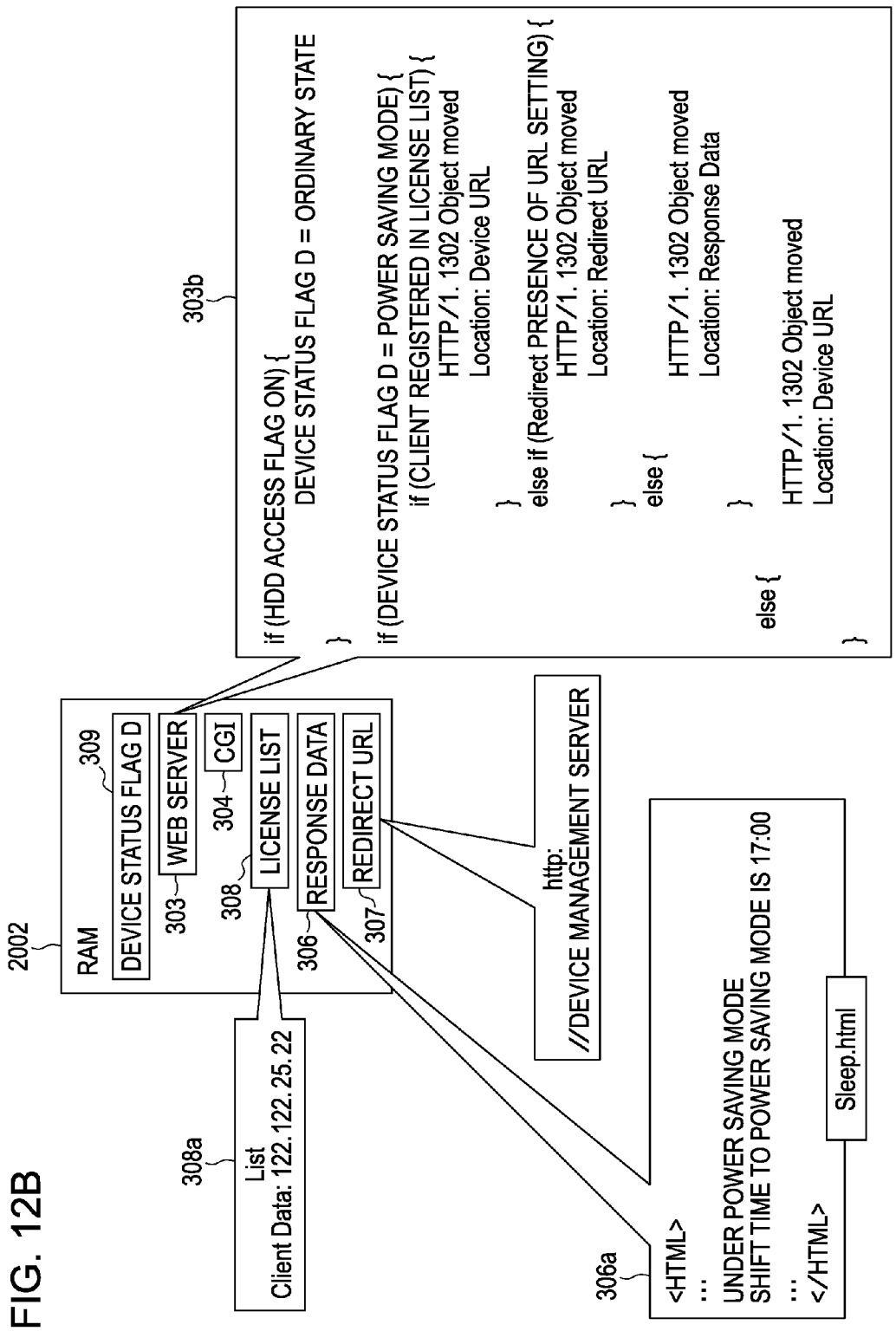

FIGS. 12A and 12B illustrate an example of data stored in the RAM 2002 and the HDD 2004 of the device 110.

As illustrated in FIG. 12A, a Web server 303, a CGI (Common Gateway Interface) 304, an access license list (License List) 308, message notification HTML data (Response Data) 306, a Redirect URL 307, and Web contents 305 are stored in the HDD 2004.

When the device 110 is powered on, the Web server 303, the CGI 304, the access license list 308, the message notification HTML data 306, and the Redirect URL 307, are loaded from the HDD 2004 into the RAM 2002 for storage therein. At that time, the status of a device status flag D 309 stored in the RAM 2002 is set to the ordinary mode. Additionally, when the device 110 is shifted to the power saving mode, the device status flag D 309 stored in the RAM 2002 is set to the power saving mode.

When the device 110 is shifted to the power saving mode, information 306a indicating the status of the device 110 is added to the message notification HTML data 306 having been stored in the RAM 2002 at the startup of the device 110 (see FIG. 12B). The information 306a indicating the status of the device 110 is, for example, a shift time to the power saving mode as illustrated in FIG. 12B.

The access license list 308 sets therein a HTTP access request source (client PC 101) that is allowed to access the Web contents 305 stored in the HDD 2004 of the device 110 when the device 110 is in the power saving mode. Whether the relevant client PC 101 is registered or not can be determined, for example, by referring to the "source IP address" illustrated in FIG. 6. While information 308a of the HTTP access request source registered in the access license list 308 is the IP address in the example of FIGS. 12A and 12B, the information 308a of the HTTP access request source need not be the IP address. For example, the information 308a can be a MAC (Media Access Control) address (destination ETHER address), or user information contained in the request message. Setting of the information 308a of the HTTP access request source is performed by the device management server 120 which manages the device 110 having shifted to the power saving mode.

The message notification HTML data (Response Data) 306 is HTML data for notifying a request source of the fact that the device 110 is in the power saving mode, when the HTTP access request is issued from the client PC 101 while the device 110 is in the power saving mode.

The Redirect URL 307 is URL for a simplified status display page for representing the status of the device 110. The simplified status display page for representing the status of the device 110 resides in the device management server 120. Further, the redirect URL 307 is set by the device management server 120.

A program 303b in FIG. 12B illustrates an example describing the processing to be executed by the device 110 when a HTTP access request is issued from the client PC 101. As indicated by the program 303b, when the HTTP access request is input from the exterior, the Web server 303 stored in the RAM 2002 first determines whether the contents of the input request demand a HDD access flag to be turned ON. As described above in the previous embodiment, the case demanding the HDD access flag to be turned ON means the case where the operation of the HDD 2004 is required, such as when an operation on the operating panel of the device 110 or processing to access the HDD 2004 is performed.

If the determination result indicates that the HDD access flag is demanded to be turned ON, the Web server 303 stored in the RAM 2002 sets the device status flag D 309 stored in the RAM 2002 to the ordinary mode state. On the other hand, if the determination result indicates that the HDD access flag is not demanded to be turned ON, the Web server 303 stored in the RAM 2002 keeps the device status flag D 309 in the same setting. Thus, when the HTTP access request is issued from the client PC 101, the Web server 303 stored in the RAM 2002 determines whether the status of the device status flag D 309 is in the ordinary mode or the power saving mode.

If the determination result indicates that the status of the device status flag D 309 is in the ordinary mode, processing is executed as follows. The Web server 303 stored in the RAM 2002 sends back, as a response, the URL of the device 110 to the client PC 101 so that a Web UI of the device 110 is displayed on the client PC 101. As a result, the responding process is switched over from the Web server 303 stored in the RAM 2002 to the Web server 303 stored in the HDD 2004.

If, on the other hand, the determination result indicates that the status of the device status flag D 309 is in the power saving mode, the Web server 303 stored in the RAM 2002 determines whether the HTTP access request source is registered in the access license list 308. If it is determined that the HTTP access request source is registered in the access license list 308, processing is executed as follows. The Web server 303 stored in the RAM 2002 sends back, as a response, the URL of the device 110 to the client PC 101 so that the Web UI of the device 110 is displayed on the client PC 101. Correspondingly, the responding process is switched over from the Web server 303 stored in the RAM 2002 to the Web contents 305 stored in the HDD 2004.

Further, if the status of the device status flag D 309 is determined as being in the power saving mode in a state where the access request source is not registered in the access license list 308 and the redirect URL 307 is set, processing is executed as follows. The Web server 303 stored in the RAM 2002 executes a redirect process of sending back the redirect URL 307 to the HTTP access request source without accessing the HDD 2004.

Moreover, if the status of the device status flag D 309 is determined as being in the power saving mode in a state where the access request source is not registered in the access license list 308 and the redirect URL 307 is not set, processing is executed as follows. The Web server 303 stored in the RAM 2002 sends back the message notification HTML data 306, which is stored in the RAM 2002 of the device 110, to the HTTP access request source.

Figure 13:
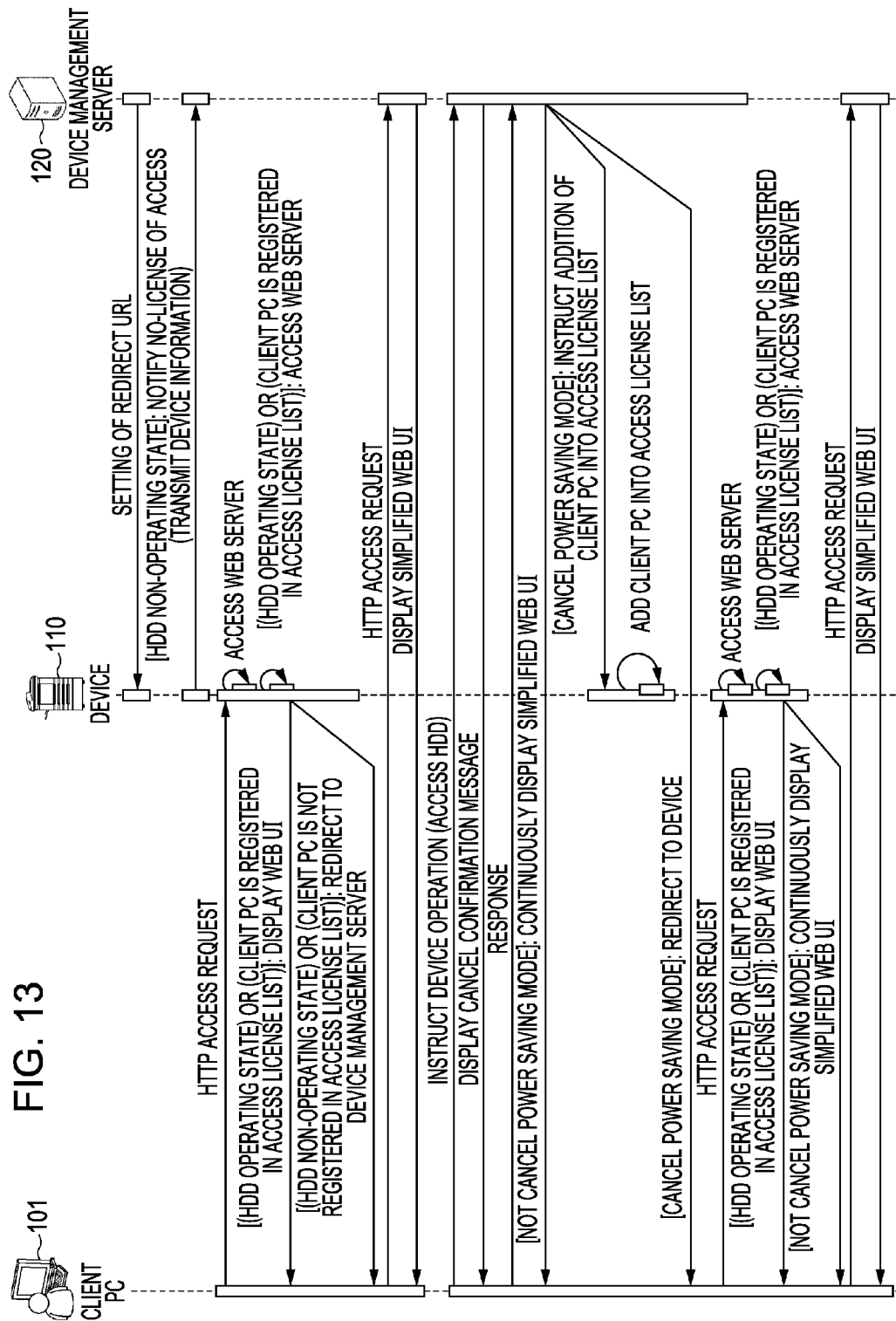
FIG. 13 illustrates an example of processing executed by the client PC, the image forming apparatus, and a device management server when the client PC accesses the image forming apparatus according to the second exemplary embodiment.
Figure 14B:
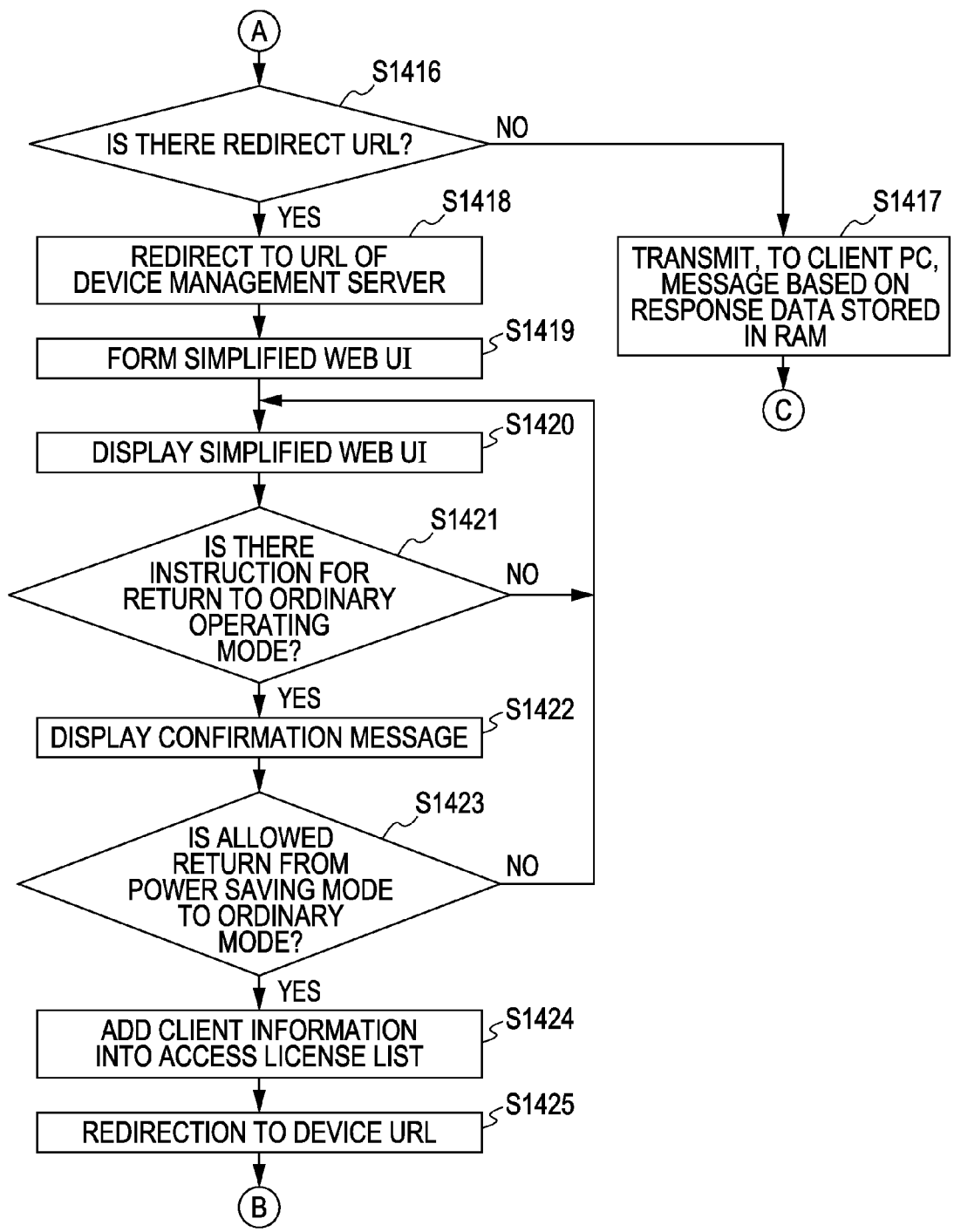
Figure 15:
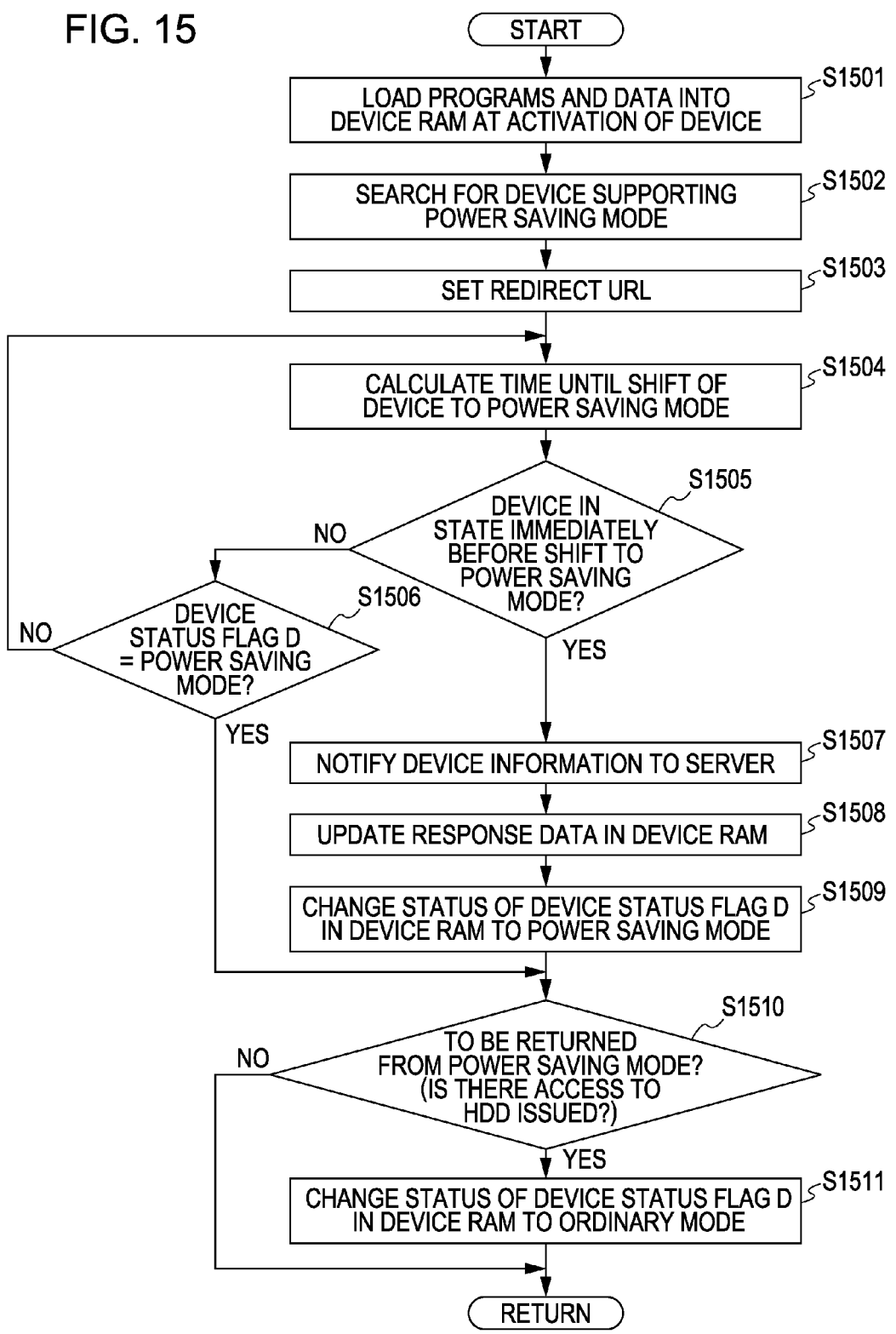
FIG. 15 is a flowchart illustrating an example of processing executed when the state of the image forming apparatus is stored in a RAM of the image forming apparatus according to the second exemplary embodiment.

FIGS. 13-15 illustrate an example of the operation performed in the network system when the client PC 101 accesses the device 110 according to the present embodiment. FIG. 13 illustrates an example of processing executed by the client PC 101, the device 110, and the device management server 120 when the client PC 101 accesses the device 110. FIGS. 14A and 14B are flowcharts illustrating an example of processing executed by the device 110 when the client PC 101 accesses the device 110. FIG. 15 is a flowchart illustrating an example of processing (i.e., step S1401 of FIG. 14A) executed when the status of the device 110 is stored in the RAM 2002 of the device 110.

Turning to FIG. 14, in step S1401, a device status acquisition process is performed in which the status of the device 110 is stored in the RAM 2002 (i.e., the status of the device status flag D 309 is set). Details of step S1401 are described below with reference to FIG. 15.

Next, in step S1402, the device 110 waits for an access from the client PC 101. If an access is issued from the client PC 101, the flow advances to step S1403, where the device 110 accesses the RAM 2002. Then, in step S1404, the device 110 confirms a destination ETHER address and a source ETHER address, which are contained in the pattern data 600. In step S1405, the device 110 confirms a source IP address and a destination IP address, which are contained in the pattern data 600.

In step S1406, the device 110 determines whether a HTTP access request message is contained in the pattern data 600. If the determination result indicates that the HTTP access request message is not contained in the pattern data 600, the processing ends. On the other hand, if the determination result indicates that the HTTP access request message is contained in the pattern data 600, the flow advances to step S1407, where the device 110 confirms the HTTP access request message.

Then, in step S1408, the device 110 determines whether the device 110 is under the operation (i.e., in the ordinary mode). If the determination result of step S1408 indicates that the device 110 is under the operation, the flow advances to step S1409. In step S1409, the device 110 accesses the Web contents 305 stored in the HDD 2004 of the device 110. Next, in step S1410, the device 110 transmits display data for the Web UI of the device 110 to the client PC 101. As a result, the Web UI is displayed on the CRT display (CRT) 1060 of the client PC 101.

If it is determined in step S1408 that the device 110 is not under the operation, the flow advances to step S1411, where the device 110 confirms the access license list 308 stored in the RAM 2002.

Then, in step S1412, the device 110 determines whether the client PC 101 having issued the HTTP access request is registered in the access license list 308 confirmed in step S1411. If the determination result of step S1412 indicates that the client PC 101 having issued the HTTP access request is not registered in the access license list 308, the flow advances to step S1416.

If, on the other hand, the determination result of step S1412 indicates that the client PC 101 having issued the HTTP access request is registered in the access license list 308, the flow advances to step S1413. In step S1413, the device 110 accesses the Web server 303 stored in the HDD 2004.

In step S1414, the device 110 returns to the ordinary mode from the power saving mode. Then, in step S1415, the device 110 transmits, to the client PC 101, data of the Web contents 305 stored in the HDD 2004 of the device 110. As a result, even when the device 110 is determined as being in the power saving state, the Web UI based on the ordinary display data is displayed on the CRT display (CRT) 1060 of the client PC 101.

If the determination result of step S1412 indicates that the client PC 101 having issued the HTTP access request is not registered in the access license list 308, the flow advances to step S1416. In step S1416, the device 110 determines whether the redirect URL 307 is set in the RAM 2002. If the determination result indicates that the redirect URL 307 is not set in the RAM 2002, the flow advances to step S1417. In step S1417, the device 110 accesses the message notification HTML data (Response Data) 306, which is temporarily stored in the RAM 2002 serving as the main storage, without accessing the HDD 2004 serving as the external storage. Further, the message notification HTML data 306 is transmitted to the client PC 101 in accordance with the processing executed by the Web server 303 which is held in the RAM 2002. As a result, data (information 306a indicating the status of the device 110) contained in the message notification HTML data 306 is displayed on the CRT display (CRT) 1060 of the client PC 101. The processing then ends.

If, on the other hand, the determination result of step S1416 indicates that the redirect URL 307 is set in the RAM 2002, the flow advances to step S1418. In step S1418, redirection to the redirect URL 307 (i.e., the device management server 120) is performed. Then, in step S1419, the device management server 120 forms a simplified Web UI (simplified status display page) for displaying information regarding the status of the device 110.

In step S1420, the device management server 120 transmits the simplified Web UI, which has been formed in step S1419, to the client PC 101 having issued the HTTP access request. As a result, the simplified Web UI is displayed on the CRT display (CRT) 1060 of the client PC 101.

In step S1421, the device management server 120 determines whether there is an access to the HDD 2004 of the device 110 (i.e., an instruction for return to the ordinary mode). Until accepting the access to the HDD 2004 of the device 110 (i.e., the instruction for return to the ordinary mode), the processing of steps S1420 and S1421 is repeated.

Upon accepting the access to the HDD 2004 of the device 110 (i.e., the instruction for return to the ordinary mode), the flow advances to step S1422. In step S1422, the device management server 120 transmits, to the client PC 101, data for displaying a message to confirm whether the device 110 is to be returned from the power saving mode to the ordinary mode. As a result, the message to confirm whether the device 110 is to be returned from the power saving mode to the ordinary mode is displayed on the CRT display (CRT) 1060 of the client PC 101.

Then, in step S1423, the device management server 120 receives, from the client PC 101, information of the user's operation result in reply to the message displayed on the client PC 101 in step S1422. Based on the received information, the device management server 120 determines whether the device 110 is allowed to return from the power saving mode to the ordinary mode. Until it is determined that the device 110 is allowed to return from the power saving mode to the ordinary mode, the processing of steps S1420-S1423 is repeated.

If it is determined that the device 110 is allowed to return from the power saving mode to the ordinary mode, the flow advances to step S1424. In step S1424, the device 110 adds the client PC 101 having issued the HTTP access request into the access license list 308. Then, in step S1425, redirection to the URL of the device 110 is made, following which the control flow returns to step S1408.

An of the device status acquisition process of step S1401 is described below with reference to the flowchart of FIG. 15.

First, in step S1501, programs and data are loaded from the HDD 2004 into the RAM 2002 upon activation of the device 110. Then, in step S1502, the device management server 120 searches for the device 110 supporting the power saving mode. Next, in step S1503, the device management server 120 sets, as the redirect URL 307, a URL of the simplified status display page for the device 110, which is held in the device management server 120, in the RAM 2002 of the device 110 having been searched for in step S1502.

In step S1504, a time until the shift of the device 110 to the power saving mode is calculated. Based on the calculation result, it is determined in step S1505 whether the device 110 is in a state immediately before the shift to the power saving mode. Herein, the wording "state immediately before the shift to the power saving mode" means a state where, after the shift of the device 110 to the ordinary mode, a predetermined time has lapsed in terms of the remaining time of the ordinary mode (i.e., the time until the shift to the power saving mode).

If it is determined in step S1505 that the device 110 is in the state immediately before the shift to the power saving mode, the flow advances to step S1507, where the device 110 transmits the information of the device 110 to the device management server 120. The information of the device 110 is, for example, information indicating the device status (such as the current mode of the device 110).

Then, in step S1508, the message notification HTML data (Response Data) 306 loaded in the RAM 2002 is modified or added with the information 306a indicating the status of the device 110. While the information 306a indicating the status of the device 110 is added to the message notification HTML data 306 having been loaded into the RAM 2002 in step S1501, the processing of the present invention is not limited to the above-described steps. For example, instead of loading the message notification HTML data 306 in step S1501, the message notification HTML data 306 added with the information 306a indicating the status of the device 110 can be loaded into the RAM 2002 in step S1508. In step S1509, the device status flag D 309 in the RAM 2002 is changed to the power saving mode. Then, the flow advances to step S1510.

If it is determined in step S1505 that the device 110 is not in the state immediately before the shift to the power saving mode, the flow advances to step S1506 to determine whether the device status flag D 309 is set to the power saving mode. If the determination result in step S1506 indicates that the device status flag D 309 is not set to the power saving mode, the flow returns to step S1504 to repeat the processing from step S1504. If the determination result in step S1506 indicates that the device status flag D 309 is set to the power saving mode, the flow advances to step S1510.

In step S1510, it is determined whether the device 110 is returned from the power saving mode. Herein, the wording "the device 110 is returned from the power saving mode" means a state where an access is issued to the HDD 2004 by a user's input operation made on the operating panel of the device 110, or inputting of a print job.

If the determination result in step S1510 indicates that the device 110 is returned from the power saving mode, the device status flag D 309 in the RAM 2002 is changed to the ordinary mode in step S1511. Thereafter, the flow returns to the flowchart of FIG. 14A. If, on the other hand, the determination result in step S1510 indicates that the device 110 is not yet returned from the power saving mode, the flow returns directly to the flowchart of FIG. 14A.

Thus, in present embodiment, when the client PC 101, i.e., the HTTP access request source, is registered in the access license list 308, the device 110 is returned from the power saving mode to the ordinary mode. When the client PC 101 having issued the access is not registered in the access license list 308, the device management server 120 confirms with the client PC 101 regarding whether the device 110 is allowed to return to the ordinary mode. Based on the confirmation result, the device 110 is returned from the power saving mode to the ordinary mode. Accordingly, in addition to the above-described advantages of the first exemplary embodiment, another advantage is obtained in that the device 110 can be returned to the ordinary mode at more appropriate timing.

While the present embodiment has been described as confirming the access license list 308 when the HDD 2004 is not operated, the access license list 308 can be confirmed regardless of whether the HDD 2004 is operated or not. In such a modification, even when the HDD 2004 is operated, the Web UI is provided only to the client PC 101 registered in the access license list 308.

For the purpose of operating various components to realize the functions of the above-described exemplary embodiments, software program code capable of realizing the functions of the exemplary embodiments can be supplied to a computer which is incorporated in an apparatus or a system and is connected to the various components. The present invention involves the case where the feature of the present invention is practiced by operating the various components in accordance with the program code stored in the computer (CPU or MPU) in the apparatus or the system.

In that case, the software program code serves to realize the functions of the exemplary embodiments. Also, not only the program code itself, but also a unit for supplying the program code to the computer, e.g., a recording medium storing the program code, constitutes the present invention. Examples of the recording medium storing the program code include a floppy disk, a hard disk, an optical disk, a magneto-optical disk, CD-ROM, a magnetic tape, a nonvolatile memory cards, and ROM.

Also, the present invention is not limited to the case where the functions of the exemplary embodiments are realized by the computer executing the program code supplied to it. As a matter of course, the present invention further involves the case in which the program code is used to realize the functions of the exemplary embodiments in cooperation with an operating system, other application software, etc., which runs on the computer.

Further, the supplied program code can be stored in a memory provided in a function expansion board inserted in the computer, and a CPU incorporated in the function expansion board can execute a part or the whole of actual processing in accordance with instructions from the program code. The present invention includes the case where the functions of the exemplary embodiments are realized with the processing executed by the CPU.

In addition, the supplied program code can be stored in a memory provided in a function expansion unit connected to the computer, and a CPU incorporated in the function expansion unit can execute a part or the whole of the actual processing in accordance with instructions from the program code. As a matter of course, the present invention includes the case where the functions of the exemplary embodiments are realized with the processing executed by the CPU.

The above-described exemplary embodiments are merely practical examples for carrying out the present invention, and they should not be construed as restricting the technical scope of the present invention. Thus, the present invention can be practiced in various forms without departing from the technical concept and features of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2006-163880 filed Jun. 13, 2006, which is hereby incorporated by reference herein in its entirety.

What is claimed is:

1. An image forming apparatus, comprising:
   an external storage unit configured to store ordinary display data used to respond to an access request from a client terminal;
   a main storage unit configured to temporarily store simplified display data which has smaller volume than the ordinary display data;
   an accepting unit configured to accept the access request from the client terminal;
   a determining unit configured to determine whether a power consumption state is in a power saving state, in which the external storage unit is not in operation and the main storage unit is operational, or an ordinary power consumption state, in which the external storage unit is in operation and the main storage unit is operational, in response to the accepting unit accepting the access request;
   a first responding unit configured to respond to the access request by using the simplified display data temporarily stored in the main storage unit without operating the external storage unit in response to the determining unit determining that the power consumption state is in the power saving state; and
   a second responding unit configured to respond to the access request by using the ordinary display data stored in the external storage unit that is under operation in response to the determining unit determining the power consumption state is in the ordinary power consumption state.

2. The image forming apparatus according to claim 1, further comprising a simplified display data forming unit configured to update the simplified display data stored in the main storage unit or to load the simplified display data from the external storage unit into the main storage unit in response to moving the power consumption state to the power saving state.

3. The image forming apparatus according to claim 2, further comprising an acquiring unit configured to acquire a state of the image forming apparatus,
   wherein, in response to the acquiring unit acquiring a state of the image forming apparatus, the simplified display data forming unit updates the simplified display data to reflect the state acquired by the acquiring unit.

4. The image forming apparatus according to claim 1, further comprising a third responding unit configured to respond to the access request by using the ordinary display data stored in the external storage unit in response to the client terminal having issued the access request being a request source which is allowed to access the image forming apparatus, even in response to the determining unit determining that the power consumption state is in the power saving state.

5. The image forming apparatus according to claim 1, wherein the simplified display data contains less data than the ordinary display data.

6. The image forming apparatus according to claim 1, wherein the external storage unit is not operated in the power saving state, and wherein the external storage unit is operated in the ordinary power consumption state.

7. The image forming apparatus according to claim 1, wherein the ordinary display data and the simplified display data are written in a markup language, the main storage unit is a random access memory, and the external storage unit is a hard disk.

8. The image forming apparatus according to claim 1, wherein a browser for viewing a display based on the ordinary display data and the simplified display data is installed in the client terminal.

9. A method for responding to an access request, the method comprising:
   storing, in an external storage unit, ordinary display data used to respond to an access request from a client terminal;
   temporarily storing, in a main storage unit, simplified display data which has smaller volume than the ordinary display data;
   accepting the access request from the client terminal;
   determining whether a power consumption state is in a power saving state, in which the external storage unit is not in operation and the main storage unit is operational, or an ordinary power consumption state, in which the external storage unit is in operation and the main storage unit is operational, in response to accepting the access request;
   responding to the access request by using the simplified display data temporarily stored in the main storage unit without operating the external storage unit in response to determining that the power consumption state is in the power saving state; and
   responding to the access request by using the ordinary display data stored in the external storage unit that is under operation in response to the determining unit determining the power consumption state is in the ordinary power consumption state.

10. The method according to claim 9, further comprising updating the simplified display data stored in the main storage unit or loading the simplified display data from the external storage unit into the main storage unit in response to moving the power consumption state to the power saving state.

11. The method according to claim 10, further comprising acquiring a state of an image forming apparatus, wherein, in response acquiring a state of the image forming apparatus, updating includes updating the simplified display data to reflect the acquired state.

12. The method according to claim 9, further comprising responding to the access request by using the ordinary display data stored in the external storage unit in response to the client terminal having issued the access request being a request source which is allowed to perform an access, even in response to determining that the power consumption state is in the power saving state.

13. The method according to claim 9, wherein the ordinary display data and the simplified display data are written in a markup language, the main storage unit is a random access memory, and the external storage unit is a hard disk.

14. The method according to claim 9, wherein the simplified display data contains less data than the ordinary display data.

15. The method according to claim 9, wherein the external storage unit is not operated in the power saving state, and wherein the external storage unit is operated in the ordinary power consumption state.

16. The method according to claim 9, wherein a browser for viewing a display based on the ordinary display data and the simplified display data is installed in the client terminal.

17. A non-transitory computer-readable storage medium storing computer-executable process steps, the computer-executable process steps causing a computer to execute the method of claim 9.

* * * * *